United States Patent
Zhu

(10) Patent No.: US 11,699,117 B2
(45) Date of Patent: *Jul. 11, 2023

(54) SYSTEM AND METHOD FOR RISK BASED CONTROL OF A PROCESS PERFORMED BY PRODUCTION EQUIPMENT

(71) Applicant: BASF SE, Ludwigshafen (DE)

(72) Inventor: Sascha Shuxia Zhu, Viernheim (DE)

(73) Assignee: BASF SE, Ludwigshafen (DE)

( * ) Notice: Subject to any disclaimer, the term of this patent is extended or adjusted under 35 U.S.C. 154(b) by 145 days.

This patent is subject to a terminal disclaimer.

(21) Appl. No.: 17/152,311

(22) Filed: Jan. 19, 2021

(65) Prior Publication Data
US 2021/0142240 A1 May 13, 2021

Related U.S. Application Data

(63) Continuation of application No. 16/072,421, filed as application No. PCT/EP2017/051575 on Jan. 26, 2017, now Pat. No. 10,915,845.

(30) Foreign Application Priority Data

Jan. 26, 2016 (EP) ..................................... 16152836

(51) Int. Cl.
*G06Q 10/0635* (2023.01)
*G05B 19/418* (2006.01)
(Continued)

(52) U.S. Cl.
CPC ..... *G06Q 10/0635* (2013.01); *G05B 19/4183* (2013.01); *G05B 19/41875* (2013.01);
(Continued)

(58) Field of Classification Search
CPC ............... G06Q 10/0635; G06Q 50/04; G05B 19/4183; G05B 19/41875; G05B 2219/31461
See application file for complete search history.

(56) References Cited

U.S. PATENT DOCUMENTS

| | | | |
|---|---|---|---|
| 10,915,845 B2* | 2/2021 | Zhu ................... | G05B 19/4183 |
| 2007/0033081 A1* | 2/2007 | Wik ................... | G05B 19/41865 |
| | | | 700/97 |

(Continued)

OTHER PUBLICATIONS

European Search Report for EP Patent Application No. 16152836.9, dated Jul. 27, 2016, 3 pages.
(Continued)

*Primary Examiner* — Dylan C White
(74) *Attorney, Agent, or Firm* — Marshall, Gerstein & Borun LLP

(57) ABSTRACT

A control system and control method for controlling a process performed by production equipment. The control system has a first interface configured to obtain, from a data provisioning module, production control data for operating the production equipment wherein the production control data relates to operating instructions configured to control the production equipment to automatically process a plurality of physical items and their respective components. It further includes a risk evaluator module configured to determine for each item a total risk value based on partial risk values associated with the respective components, and further configured to detect a change in the determined total risk values. It further includes a control unit configured to: initiate, via a second interface, execution of the operating instructions for manufacturing a particular item having the lowest total risk value during a first operating time interval; initiate termination of the execution of the operating instructions for processing the particular item if the change in the determined total risk values results in an alternative item having the lowest total risk value; and initiate, via the second interface, execution of the operating instructions for processing the alternative item during a second operating time interval.

21 Claims, 8 Drawing Sheets

(51) Int. Cl.
*G06Q 50/04* (2012.01)
*G06Q 50/18* (2012.01)

(52) U.S. Cl.
CPC ... *G05B 2219/31461* (2013.01); *G06Q 50/04* (2013.01); *G06Q 50/184* (2013.01); *Y02P 90/02* (2015.11); *Y02P 90/30* (2015.11)

(56) References Cited

U.S. PATENT DOCUMENTS

| 2009/0171493 | A1 | 7/2009 | Govind et al. | |
|---|---|---|---|---|
| 2014/0019471 | A1 | 1/2014 | Linton et al. | |
| 2022/0026884 | A1* | 1/2022 | Quiros Araya | .... G05B 19/4185 |

OTHER PUBLICATIONS

European Search Report for EP Patent Application No. 22168108.3, dated Aug. 25, 2022, 3 pages.
International Search Report for PCT Patent Application No. PCT/EP2017/051575, dated May 16, 2017, 3 pages.

* cited by examiner

3000 

| Total risk value | Operating instructions (CU 120) |
|---|---|
| 0% to 40% | control mode 1: No action - the manufacturing process is not changed |
| >40% | control mode 2: send notification about the risk status |
| >60% | control mode 3: change manufacturing process to a predefined design-around process for producing alternative item during future operating interval and prepares for switch event, provided the total IP risk value of the alternative item is not >40%; control mode 2 is also triggered for the event "exceeding 60% threshold" |
| >80% | control mode 4: terminate the manufacturing process after completion of the current operating time interval (e.g., within one day) and prepares for the switching event; control mode 2 is also triggered for the event "exceeding 80% threshold" |
| >90% | control mode 5: CU terminate the manufacturing process during the current operating time interval (e.g., within one hour) and prepare for switching event; operation mode 2 is also triggered for the event "exceeding 90% threshold" |

| t | item | C1 | C2 | C3 | RNIP | RIP | Rt | PO L1 |
|---|---|---|---|---|---|---|---|---|
| Day 0 | I1 | A_1 | B_1 | C_1 | 10% | 20% | 15% | 0% |
| Day 0 | I2 | A_1 | B_2 | C_1 | 30% | 10% | 20% | 0% |
| Day 0 | I3 | A_1 | B_1 | C_2 | 40% | 20% | 30% | 0% |
| Day 0 | I4 | A_1 | B_2 | C_2 | 50% | 10% | 30% | 0% |
| Day 0 | I5 | A_2 | B_1 | C_1 | 40% | 10% | 25% | 0% |
| Day 0 | I6 | A_2 | B_2 | C_1 | 60% | 10% | 35% | 0% |
| Day 0 | I7 | A_2 | B_1 | C_2 | 70% | 10% | 40% | 0% |
| Day 0 | I8 | A_2 | B_2 | C_2 | 80% | 10% | 45% | 0% |
| Day 1 | I1 | A_1 | B_1 | C_1 | 10% | 20% | 15% | 100% |
| Day 1 | I2 | A_1 | B_2 | C_1 | 30% | 10% | 20% | 0% |
| Day 1 | I3 | A_1 | B_1 | C_2 | 40% | 20% | 30% | 0% |
| Day 1 | I4 | A_1 | B_2 | C_2 | 50% | 10% | 30% | 0% |
| Day 1 | I5 | A_2 | B_1 | C_1 | 40% | 10% | 25% | 0% |
| Day 1 | I6 | A_2 | B_2 | C_1 | 60% | 10% | 35% | 0% |
| Day 1 | I7 | A_2 | B_1 | C_2 | 70% | 10% | 40% | 0% |
| Day 1 | I8 | A_2 | B_2 | C_2 | 80% | 10% | 45% | 0% |
| Day 2 | I1 | A_1 | B_1 | C_1 | 10% | 70% | 40% | 100% |
| Day 2 | I2 | A_1 | B_2 | C_1 | 30% | 10% | 20% | 0% |
| Day 2 | I3 | A_1 | B_1 | C_2 | 40% | 70% | 55% | 0% |
| Day 2 | I4 | A_1 | B_2 | C_2 | 50% | 10% | 30% | 0% |
| Day 2 | I5 | A_2 | B_1 | C_1 | 40% | 10% | 25% | 0% |
| Day 2 | I6 | A_2 | B_2 | C_1 | 60% | 10% | 35% | 0% |
| Day 2 | I7 | A_2 | B_1 | C_2 | 70% | 10% | 40% | 0% |
| Day 2 | I8 | A_2 | B_2 | C_2 | 80% | 10% | 45% | 0% |
| Day 3 | I1 | A_1 | B_1 | C_1 | 10% | 70% | 40% | 0% |
| Day 3 | I2 | A_1 | B_2 | C_1 | 30% | 10% | 20% | 100% |
| Day 3 | I3 | A_1 | B_1 | C_2 | 40% | 70% | 55% | 0% |
| Day 3 | I4 | A_1 | B_2 | C_2 | 50% | 10% | 30% | 0% |
| Day 3 | I5 | A_2 | B_1 | C_1 | 40% | 10% | 25% | 0% |
| Day 3 | I6 | A_2 | B_2 | C_1 | 60% | 10% | 35% | 0% |
| Day 3 | I7 | A_2 | B_1 | C_2 | 70% | 10% | 40% | 0% |
| Day 3 | I8 | A_2 | B_2 | C_2 | 80% | 10% | 45% | 0% |

| t | item | C1 | C2 | C3 | RNIP | RIP | Rt | PO L1 |
|---|---|---|---|---|---|---|---|---|
| Day 0 | I1 | A_1 | B_1 | C_1 | 10% | 20% | 15% | 0% |
| Day 1 | I1 | A_1 | B_1 | C_1 | 10% | 20% | 15% | 100% |
| Day 2 | I1 | A_1 | B_1 | C_1 | 10% | 70% | 40% | 100% |
| Day 2 | I2 | A_1 | B_2 | C_1 | 30% | 10% | 20% | 0% |
| Day 2 | I3 | A_1 | B_1 | C_2 | 40% | 70% | 55% | 0% |
| Day 2 | I4 | A_1 | B_2 | C_2 | 50% | 10% | 30% | 0% |
| Day 2 | I5 | A_2 | B_1 | C_1 | 40% | 10% | 25% | 0% |
| Day 2 | I6 | A_2 | B_2 | C_1 | 60% | 10% | 35% | 0% |
| Day 2 | I7 | A_2 | B_1 | C_2 | 70% | 10% | 40% | 0% |
| Day 2 | I8 | A_2 | B_2 | C_2 | 80% | 10% | 45% | 0% |
| Day 3 | I1 | A_1 | B_1 | C_1 | 10% | 70% | 40% | 0% |
| Day 3 | I2 | A_1 | B_2 | C_1 | 30% | 10% | 20% | 100% |
| Day 3 | I3 | A_1 | B_1 | C_2 | 40% | 70% | 55% | 0% |
| Day 3 | I4 | A_1 | B_2 | C_2 | 50% | 10% | 30% | 0% |
| Day 3 | I5 | A_2 | B_1 | C_1 | 40% | 10% | 25% | 0% |
| Day 3 | I6 | A_2 | B_2 | C_1 | 60% | 10% | 35% | 0% |
| Day 3 | I7 | A_2 | B_1 | C_2 | 70% | 10% | 40% | 0% |
| Day 3 | I8 | A_2 | B_2 | C_2 | 80% | 10% | 45% | 0% |

FIG. 6B

SYSTEM AND METHOD FOR RISK BASED CONTROL OF A PROCESS PERFORMED BY PRODUCTION EQUIPMENT

CROSS REFERENCE TO RELATED APPLICATIONS

This application is a continuation of U.S. patent application Ser. No. 16/072,421, entitled SYSTEM AND METHOD FOR APPLYING LIQUID MIXTURES, filed Jul. 24, 2018, the entire disclosure of which is hereby expressly incorporated herein by reference.

TECHNICAL FIELD

The present invention generally relates to control of a production process, and more particularly, relates to control of production processes in accordance with risk assessments.

BACKGROUND

Production control systems are known in the art to control production equipment for automatically manufacturing physical products. The degree of automation varies. Some production lines still need substantial interaction with human operators. Other types of production lines are operated independently from human interaction by use of robots and/or cyber physical systems which can communicate amongst each other as well as with control systems providing the corresponding operating instructions to the various components of the production equipment to automatically perform respective steps of the production process. Typically, the production equipment receives control instructions including technical control parameters for the respective functions of the production equipment wherein the control parameters are configured to cause the production equipment to perform a sequence of production steps to manufacture a final product (physical item). Typically, in such a process firstly components of the product are manufactured which are then assembled into the final product. The depth of production, that is, the number of hierarchy levels in the component structure of the final product, may vary significantly for different types of products.

The higher the degree of automation, the lower the possibility for human operators to control the production equipment. In situations, where a high degree of automation is achieved, operators are likely not available to assess potential risks for the production process which may lead to the production of waste. For example, a particular risk may occur during the operation of the production equipment leading to the production of non-usable final products when ignoring the risk.

SUMMARY

There is therefore a need to improve control mechanisms of production equipment tor automated processes performed by production equipment to avoid the production of non-usable products (physical items) because of ignored risks. Thereby, production equipment, as used in the present disclosure, refers to any machine or tool (production module) which can be controlled in such way that it automatically performs steps of an automated process in response to corresponding operating instructions. Typically, production equipment includes a plurality of production modules which are used sequentially or in parallel to perform the process steps applied to the products and/or components. In some cases, the production equipment may include only one production module.

The above technical problem is solved by a control system and a control method according to the independent claims. Thereby, the control system is configured to determine actual risk values for respective products and/or their components and use such risk values directly to control the process performed by the production equipment accordingly by providing adjusted process control data to the production equipment. The adjusted process control data is configured to switch the process from a processing mode associated with a particular risk value to another processing mode associated with a lower risk value. It can be advantageous that the adjustment of the process control data based on determined risk values occurs automatically without any interaction with a human operator. Thereby, a risk value, as used in the present disclosure, can be a scalar value, a risk vector, or a multidimensional risk matrix where different risk categories may be reflected by the various elements of the risk value. The control system includes one or more processors and at least one memory component which are configured to implement the functions of the control system via software modules which are stored in the memory component and executed by the one or more processors at runtime of the control system.

In one embodiment, a control system for controlling a process (e.g., production process, testing process, cleaning process, etc.) performed by production equipment includes a first interface which obtains process control data from a data provisioning module. The process control data relates to operating instructions configured to control the production equipment to automatically process one or more physical items (products) and their respective components. In other words, the process control data either already includes or can at least be transformed into control data configured for operating the production equipment to perform the various steps of the production process. The process control data may include information from a bill of material of the manufactured product and information about the work steps accordingly. Such data is typically provided by data provision modules, such as for example, Enterprise Resource Planning (ERP) systems or similar systems. The process control data may also include control production equipment specific instructions (e.g., computer-integrated manufacturing (CIM) data), such as for example, instructions to control the movement of a robot in accordance with the production step to be performed. Such data can be provided by equipment specific libraries. As used herein after, a data provisioning module can be any software or hardware system which provides data that is relevant for controlling the process performed by the production equipment.

The control system further includes a risk evaluator module configured to determine for each item (product) a total risk value based on partial risk values associated with the respective components of the product. Further, the risk evaluator monitors the determined risk values over time and can detect changes in the determined total risk values.

In one embodiment, a change in the previously determined total risk values is detected when a particular change of at least one of the determined risk values exceeds a predefined tolerance range. That is, only when the change of a total risk value is large enough in that it exceeds a predefined threshold (tolerance range) it will be recognized by the risk evaluator as a relevant change which requires an adjustment of the (production) process.

The control system further includes a control unit configured to control the production equipment to perform a process by sending operating instructions to the respective production modules of the production equipment. In general, such an automatic control unit can be used to control any risk-relevant process (i.e. manufacturing, treatment, analysis/testing/screening (incl. high-throughput screening), supply chain, procurement, sales, software release etc.) the control unit may carry out various control modes which may depend on the input of the risk evaluator module.

The operating instructions, when executed by the production modules, cause the production modules to perform the corresponding processing steps of the production process. For this purpose, the control system has a second interface which is configured to communicate with production modules of the production equipment to provide corresponding operating instructions to the production modules. Via the second interface the control unit initiates execution of the operating instructions for processing a particular item having the lowest total risk value during a first operating time interval. In other words, as an example, once the risk evaluator has determined the total risk values for the products (physical items) which are candidates for production by the production equipment, the risk evaluator can identify the particular item which has the lowest risk value of all items as the item to be processed by the equipment during the first operating time interval. The first operating time interval is a defined period of time with defined start and end time points during which the production equipment is operated to process the particular item. Typically, operating time intervals are provided by a production planning system.

If the change in the determined total risk values results in an alternative item having the lowest total risk value, or if the change of the total risk value associated with the particular item exceeds a predefined threshold value, the control unit initiates termination of the execution of the operating instructions for processing the particular item. Particularly, if the change in the determined total risk values results in an alternative item having the lowest total risk value and results in a difference between said total risk value of the alternative item and the updated total risk value of the particular item exceeding a predefined threshold difference value, the control unit initiates termination of the execution of the operating instructions for processing the particular item. Optionally, the alternative item may be selected from a plurality of physical items in accordance with a product specification of the particular item in that the alternative item performs a similar function or a very similar function or the same function as the particular item. For example, if the particular item is a cleaning liquid having the function to remove limescale, from a surface, items which do not include limescale remover components may not be taken into consideration as alternative items. The term "similar" in "similar function" with respect to function no. 1 and function no. 2 means the following: Under the assumption that function no. 1 achieves 100% value of a specific parameter (e.g. 100% of cleaning efficiency for limescale within 5 minutes under specific conditions), function no. 2 achieves at least 50% value, at most 200% value of this parameter (e.g. at least 50%, or at most 200% of cleaning efficiency for limescale within 5 minutes under the same conditions). The term "very similar" in "very similar function" with respect to function no. 1 and function no. 2 means the following: Under the assumption that function no. 1 achieves 100% value of a specific parameter (e.g. 100% of cleaning efficiency for limescale within 5 minutes under specific conditions), function no. 2 achieves at least 70% value, at most 140% value of this parameter (e.g. at least 70%, or at most 140% cleaning efficiency for limit scale within 5 minutes under the same conditions).

The termination of the execution of the operating instructions is also initiated if the change of the total risk value associated with the particular item exceeds a predefined threshold value. In this case, the particular item may still be associated with the lowest risk value of all determined risk values. However, in this case, the absolute value of the total risk value requires termination of the execution.

In other words, once a change in the total risk values is detected by the risk evaluator in that the currently processed particular item is not associated anymore with the lowest risk value or in that its risk value has increased substantially (exceeding the predefined threshold) then processing of the particular item is stopped by the respective production modules in response to a corresponding termination instruction sent by the control unit. In case the change in the determined total risk values results in the alternative item having the lowest total risk value, the control unit initiates, via the second interface, execution of the operating instructions for processing the alternative item during a second operating time interval. The second operating time interval is subsequent to the first operating interval. The start of the second operating time interval is typically delayed versus the end of the first operating interval by a setup time interval which is needed to switch the configuration of the production modules from the particular item to the alternative item.

The term "alternative items", as used in the present disclosure, includes items which differ in at least one technical feature compared to the particular item. The term "alternative items" includes items which are physically different from the particular item (e.g., having a different physical or chemical composition), and further includes items which are physically identical (e.g, having the same physical or chemical composition) to the particular item but where the process applied to the alternative item is different from the process applied to the particular item.

The term "lowest total risk value", as used in the present disclosure, means "lowest total risk value of the determined total risk values".

Regarding the discontinuation of the processing of the currently manufactured item, in one embodiment, the control unit may support different control modes. For example, in a first control mode, the instruction to terminate the execution of the operating instructions for processing the particular item may lead to a termination of the process at the end of the first operating time interval. This may be advantageous if no immediate action is required. In a second control mode, the instruction to terminate the execution of the operating instructions for processing the particular item may lead to the termination of the process during the first operating time interval. This may be advantageous in emergency situations Where immediate action is required. For example, if a partial risk value indicates that one of the product components is not complying with a technical specification (for example, the purity of a solvent is insufficient) the process may be stopped immediately.

In one embodiment, the risk evaluator module is further configured to determine the total risk value based on partial risk values comprising IP risk values related to existing intellectual property rights regarding the physical items and their respective components, processes, methods, uses (in particular related to patents with protect features used by or included in the physical items), and based on non-IP risk values regarding the physical items and their respective components. In other words, the total risk value of a physical item typically includes multiple risk components (partial risk values) which may be associated with different risk categories. For example, partial risk values may be associated with technical issues, such as for example, technical specifications of the items and/or components or the maintenance status of the production modules needed for the processing of a particular item/component. Partial risk values may also be associated with non-technical issues, such as for example, intellectual property rights having impact on the use of certain products and/or components, or other non-technical risks affecting the commercial value of the produced physical items.

The term "IPL object", as used in the present disclosure, includes: (a) intellectual property rights (referred to as "IPR objects" in the following) including but not limited to patents, design rights, trademarks, trade dress, copyrights, data protection rights, exclusive-use or data rights in the context of product registrations, database protection rights, business methods, trade secrets, Integrated Circuit layout design protection rights, plant breeder's rights, geographical indications; (b) legal and/or contractually stipulated rights and/or obligations other than intellectual property rights (referred to as "legal objects" in the following), including (b1) general legal and/or contractually stipulated rights (referred to as "general legal objects" in the following), including but not limited to the right of ownership or the right to own, the right of disposal, the right to use, the right to make use of, the right to control, the obligation of ownership, the obligation not to own, the obligation not to dispose of the obligation to use, the obligation not to use, the obligation to control, and the obligation not to control; (b2) production/R&D related legal and/or contractually stipulated rights and/or obligations (referred to as "technical legal objects" in the following), including but not limited to the right to process, the right to manufacture, the right to assemble, the right to transform, the right to duplicate, the right to conduct research, the right to develop, the right to test, the right to evaluate, the right to publish, the right to destroy, the right to disassemble, the right to withhold, the obligation to process, the obligation not to process, the obligation not to manufacture, the obligation to assemble, the obligation not to assemble, the obligation to transform, the obligation not to transform, the obligation to duplicate, the obligation not to duplicate, the obligation to conduct research, the obligation not to conduct research, the obligation to develop, the obligation not to develop, the obligation to test, the obligation not to test, the obligation to evaluate, the obligation not to evaluate, the obligation to publish, the obligation to keep confidential, the obligation not to publish, the obligation to destroy, the obligation not to destroy, the obligation to disassemble, the obligation not to disassemble, the obligation to withhold, the obligation not to withhold; (b3) go-to-market related legal and/or contractually stipulated rights and/or obligations (referred to as "commercial legal objects" in the following), including but not limited to the right to distribute, the right to purchase, the right to lease, the right to offer, the right to sell, the right to import (e.g. into specific countries), the right to export (e.g. into specific countries), the right to transport, the obligation to distribute, the obligation not to distribute, the obligation to purchase, the obligation not to purchase, the right to lease, the right not to lease, the obligation to offer, the obligation not to offer, the obligation to sell, the obligation not to sell, the obligation to import, the obligation not to import, the obligation to export, the obligation not to export, the obligation to transport, the obligation not to transport; (b4) payment related legal and/or contractually stipulated rights and/or obligations (referred to as "transaction legal objects" in the following), including but not limited to the right to make a payment, the right to receive payment (e.g. fees, license fees, taxes, etc.), the obligation to pay (e.g. fees, license fees, taxes, etc.), the obligation not to pay, the obligation to withhold payment, the obligation to receive payment, the obligation not to receive payment; (b5) regulatory related legal and/or contractually stipulated rights and/or obligations (referred to as "regulatory legal objects" in the following), including but not limited to the obligation to inform or report (e.g. to third parties and/or government agencies), the obligation to apply for an approval, the obligation to grant an approval, the obligation not to grant an approval, the right to receive information or report, the right to receive registration, the right to obtain information from a label, the right to add or remove a label, the right to inspect, the right to monitor, the right to put under quarantine, the right to keep a sample, right to confiscate, the obligation not to inform or report, the obligation not to register, the obligation to obtain information from a label, the obligation to add a label, the obligation to remove a label, the obligation to be inspected, the obligation to be monitored, the obligation to put under quarantine, the obligation to keep a sample, the obligation not to keep a sample, the obligation to confiscate, the obligation not to confiscate, and the registration obligations including but not limited to the obligation to register, the obligation to register under product registration laws, the obligation to register under consumer product or food registration or food safety laws, the obligation to register under chemical, pesticide, or biological products registration laws [e.g. REACH (Registration, Evaluation, Authorization and Restriction of Chemicals), GHS (Globally Harmonized System of Classification and Labelling of Chemicals)]. The term "register" or "registration" as used in the present disclosure includes any activities related to registration, including but not limited to applying for, extending, obtaining, renewing, reviewing, updating, and/or checking the status of an approval, a certification, a clearance, a legalization, a notarization, a notification, a registration, a translation, including checking the status of a registration law or regulation, and also including adding, furnishing or providing a record, a document, a signature, a stamp, a sample, or a label.

The term "patent", as used in the present disclosure, includes utility patents, patent applications, divisional, re-issue, re-examination, continuation, continuation-in-part applications, addition patents, utility models, innovation patents, business method patents, covered business method (CBM) patents, design patents, and any extension of such patents including supplementary protection certificates and applications thereof.

The term "existing" in relation to "IPL objects" means any IPL objects on which information is available in any form, including any IPL objects which will be, is being, or have been filed, published, or made accessible to a party. The IPL objects can be each country- or region-specific.

The term "IP risk" means any risks related to IPL objects.

The term "non-IP risk" means any risks unrelated to IPL objects.

The term "IP database" means any database containing information on IPL objects, particularly any database containing more or significantly more information related to IPL objects than information unrelated to IPL objects.

The term "non-IP database" means any database containing more information unrelated to IPL objects than information related to IPL objects.

In one embodiment, the WI: objects are IPR objects. In another embodiment, the IPL objects are legal objects. In another embodiment, the IPL objects are general legal objects. In another embodiment, the IPL objects are technical legal objects. In another embodiment, the IPL objects are commercial legal objects. In another embodiment, the IPL objects are transaction legal objects. In another embodiment, the IPL objects are regulatory legal objects. In another embodiment, the IPL objects is the registration obligation, particularly the obligation to register under product registration laws, the obligation to register under consumer product or food registration or food safety laws, and the obligation to register under chemical, pesticide or biological products registration laws (e.g. REACH, GHS). In another embodiment, the IPL objects are patents, designs and trademarks. In another embodiment, the objects are patents and trademarks. In another embodiment, the IPL objects are patents.

In any case, risk values as used in the present disclosure, relate to uncertainties regarding the potential later use of one or more processed physical items and/or to the process applied to the physical items wherein the risk values are directly used to control the process performed by the respective production modules in accordance with the findings of the risk evaluator without any human interaction.

In one embodiment, the control system can retrieve information for computing IP risk values from one or more IP databases via the first interface. Further, information for computing non-IP risk values can be retrieved from one or more non-IP databases. The risk evaluator module may detect a change of the total risk value of a particular item based on a partial IP risk value change as a result of a status change of a corresponding IPL object in the one or more IP databases. For example, if a pending patent application is directed to a compound being used by a processed item and the status of the patent application in a monitored IP database switches to "granted" for countries which are relevant markets for the processed item, the corresponding partial IP risk value will typically increase. On the other hand, if the patent application is rejected or the respective patent is revoked, the corresponding partial IP risk value will typically decrease. A change in the evaluation of the corresponding IPL object can also regarded as a status change of the IPL object. For example, if the corresponding IPL object is associated with a right that has been regarded as invalid through an internal validity analysis, this information will be provided to the database resulting in a status change of the IPL object, and in this case, the corresponding partial IP risk value will typically decrease.

In some embodiments, a change of a particular total risk value for a particular item may be associated with risk contributions of one or more particular components. That is, the total risk value for the particular item depends on risk values of its components. The risk evaluator may then identify for the particular item one or more alternative components as substitutes with lower risk value contributions by searching for components with at least one similar or very similar structure function and/or technical feature in a corresponding database. For example, in the field of chemical components used in chemical processes, established databases for such structure/function/technical feature analyses are for example SciFinder, REAXYS, ChemSpider, PubChem, ChemIDplus, SPRESI database, CAMPUS (Computer Aided Material Preselection by Uniform Standards) database, Beilstein database, or DrugBank. Once the alternative component(s) are identified, the control unit can instruct the production equipment to replace at least one of the one or more particular components with an identified alternative component so that the total risk value of the particular item becomes the lowest total risk value. In this embodiment, the production equipment does not switch to a totally different final product with a lower risk value but changes the component structure of the currently manufactured item by replacing high risk components with low risk substitute components so that the modified currently manufactured products has again the lowest risk value of all physical items which can be produced by the production equipment.

In one embodiment, a control method performed by the previously disclosed control system is used to control the production equipment using the steps: obtaining, from a data provisioning module, process control data for operating the production equipment wherein the process control data includes operating instructions configured to control the production equipment to automatically process one or more physical items and their respective components; determining for each item a total risk value based on partial risk values associated with the respective components; initiating execution of the operating instructions for processing a particular item having the lowest total risk value during a first operating time interval; detecting a change in the determined total risk values; if the change in the determined total risk values results in an alternative item having the lowest total risk value, or if the change of the total risk value associated with the particular item exceeds a predefined threshold value, initiating termination of the execution of the operating instructions for processing the particular item; and if the change in the determined total risk values results in the alternative item having the lowest total risk value, initiating execution of the operating instructions for processing the alternative item during a second operating time interval.

In a further embodiment, computer program instructions may be stored on a computer readable medium forming a computer program product which when executed by one or more processors of the control system causes the control system to perform said control method.

Further aspects of the invention will be realized and attained by means of the elements and combinations particularly depicted in the appended claims. It is to be understood that both the foregoing general description and the following detailed description are exemplary and explanatory only, and are not restrictive of the invention as described.

BRIEF DESCRIPTION OF THE DRAWINGS

FIG. 3 shows a table which illustrates an e, ample of control system behavior in different control modes;

FIGS. 6A, 6B illustrate example scenarios with risk values for various items and production output of a production line in view of the risk values.

DETAILED DESCRIPTION

Figure 1:
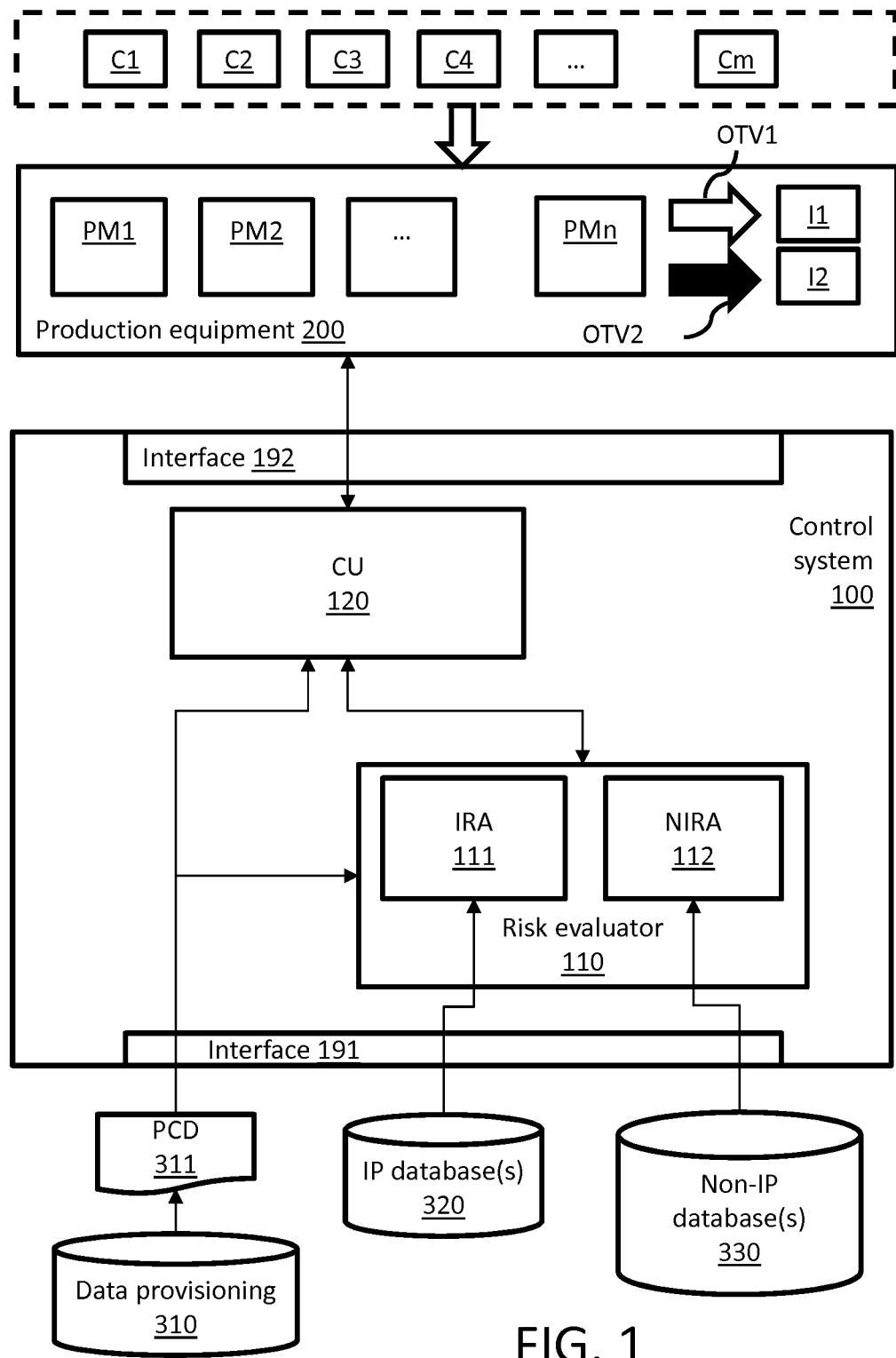
FIG. 1 is a simplified block diagram of a control system for controlling a process performed by production equipment according to an embodiment of the invention.
Figure 2:
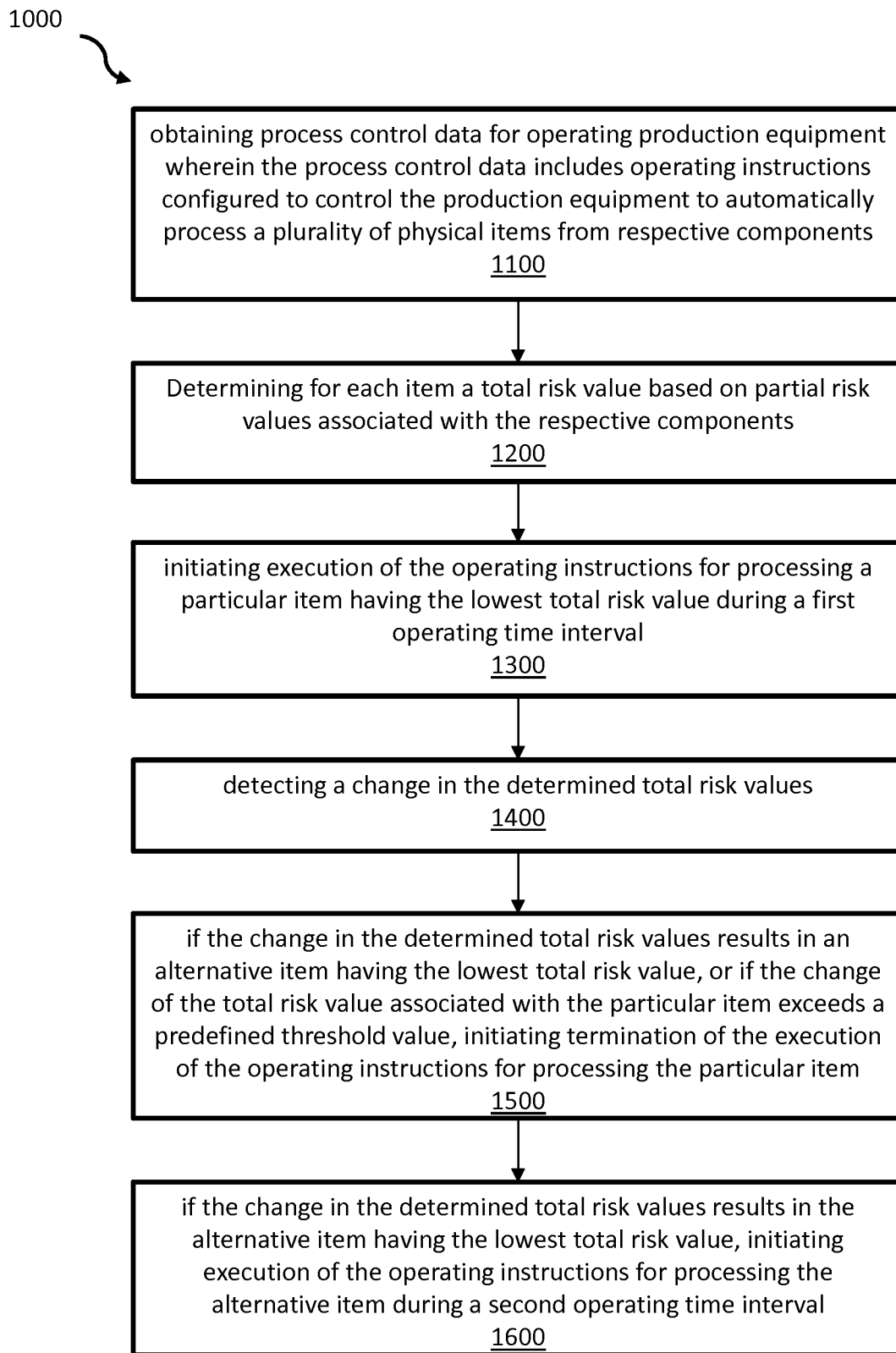
FIG. 2 is a simplified flow chart of a control method performed by the control system according to an embodiment of the invention.

FIG. 1 is a simplified component diagram of a production control system 100 for controlling a process performed by production equipment 200. The functioning of the production control system is described in view of the simplified flow chart of the production control method 1000, as illustrated in FIG. 2, performed the by production control system 100. Therefore, reference numbers of both figures (FIG. 1, FIG. 2) are used in the following paragraphs.

The production equipment 200 includes one or more production modules PM1 to PMn (e.g., robots, chemical reactors, etc.). For example, the various production modules can perform production steps for producing one or more physical items I1, I2. In some embodiments, the production equipment 200 can be a production line for performing the assembly of the physical items I1, I2 based on a plurality of components C1 to Cm. Each of the physical items I1, I2 (e.g., final products) may be based on a different subset of the plurality of components C1 to Cm. The respective components are automatically provided to the production equipment (e.g., via robots, conveyor belts, tubes, valves, etc.). In some embodiments, the production equipment 200 may be chemical plant equipment configured to perform a chemical process. In case of a chemical process, the respective components of the final product are, for example, chemical substances. In one embodiment, the production equipment may be configured to perform test production runs for tuning a production process. The production equipment 200 is controlled by the control system 100 to automatically produce various physical items I1, I2 during corresponding operating, time intervals OTV1, OTV2. In other words, for example, the production equipment 200 is set up to produce the first item I1 during the first operating time interval OTV1. Then the production equipment may be reconfigured to produce the second item I2 during the second operating time interval OTV2. The first and second items I1, I2 may be based on different components and may make use of different production modules. Automated production equipment is well known in the art (e.g., in the automotive, chemical industry, and other many industries) and does not require further disclosure to a person skilled in the art of automated production processes.

The term "physical item" is any item which is physically existent, including but not limited to:
(a) machine, mechanical parts, electrical parts, devices, instruments, vehicles, building elements,
(b) consumer goods, food, beverage,
(c) molecules, chemical compounds, chemical substances, chemical compositions,
(d) organisms in a living or dead state (for example plants or micro-organisms in a living or dead state).

"Physically existent" means anything that has a state of matter, including but not limited to the low-energy classical states of matters such as solid, liquid, gas and plasma.

The term "component" means any physically existent part of the physical item. Two components are different from each other if they differ in at least one technical feature.

The term "technical feature" means any feature which can be determined by a human sense organ or by sense organ of another living organism or by a physically existent instrument. Technical features include but are not limited to physical features, chemical features and biological features. Examples for physical features are physical parameters such as weight, geometries, density, temperature, color, viscosity, conductivity, and durability. Examples for chemical features are chemical composition in the analytical sense (i.e. which molecules or chemical substances are contained in a component), solubility reactivity, reaction rate, chemical structure. Examples for biological features are sterility, reproduction rate, fertility, and gene sequences. The fact that a physical item or a component comprises computer data is also an example for a technical feature. The fact that a physical item or a component has undergone a certain physical or chemical process is also an example for a technical feature. For example, if physical item I1 and physical item I2 are physically identical (i.e. have the same physical or chemical composition), but item I1 was produced by process P1 and item I2 by a different process P2, then both components differ in the technical feature regarding their production process. For example, if component A1 and component A2 are physically identical (i.e. have the same physical or chemical composition), but component C1 was produced by process P1 and component C2 by a different process P2, then both components differ in the technical feature regarding their production process.

If the physical item consists of only one component, the component is the physical item as such.

The term "production equipment" means any physically existent equipment which is suitable for processing at least one component of a physical item or suitable for processing the physical item as such. "processing a component" means either (a) changing at least one of the technical features of the component, or (b) obtaining information on (e.g. testing, measuring or analyzing) at least one of the technical features of the component, or (c) manufacturing or producing the component, (d) treating, purifying, cleaning or recycling the component, (e) transforming the component to another component or to a part of another component, or (f) adding this component to or removing this component from the physical item, With regard to a physical item, "processing a physical item" means manufacturing or producing it, or processing a component of the physical item.

In the example of FIG. 1, the control system 100 is illustrated as a monolithic block (e.g., implementation on a single hardware resource). However, in some embodiments, the modules of the control system 100 may be distributed across multiple hardware resources which together form the control system at the logical level. For example, in a real implementation, the control unit 120 of the control system may be an integral part of the production equipment 200 and the risk evaluator sub-modules 111, 112 may be integral parts of the respective databases 320, 330. In another implementation, the control system 100 may be a module of a central enterprise control system, such as for example, an enterprise resource planning (ERP) system, which has appropriate interfaces 191, 192 to communicate with external databases and the production equipment.

In another embodiment, the control system (100) can also control or communicate with other production equipment connected to production equipment (200), for example production equipment on the upstream or downstream side of the production equipment (200).

The first interface 191 is configured to obtain 1100, from a data provisioning module 310, production control data 311 for operating the production equipment 200. In the example, the process control data corresponds to production control data (PCD) 311 including operating instructions configured to control the production equipment 200 to automatically process one or more physical items I1, I2 and their respective components C1 to Cn. For example, PCD 311 can include so-called routings which include lists of the various productions steps to be applied to respective items/components. Information like routings of bills of materials for the various items is typically provided by ERP systems. This information can be transformed by the control unit into technical control parameter information which is provided to the various production modules PM1 to PMn via the second interface 192 to instruct the production modules to perform production steps according to PCD 311. It is well known to a person skilled in the art how to retrieve (e.g, via remote function call interfaces or appropriate web service interfaces) and transform production control data from such data provisioning modules 310 into technical control parameters which can be directly applied to respective production modules.

The control system 100 further includes the risk evaluator module 110 configured to determine 1200 for each item I1, I2 a total risk value based on partial risk values associated with the respective components. Further, the risk evaluator 110 can detect if there occurs any change in the determined total risk values. In other words, the risk evaluator 110 can compute the initial total risk values for the plurality of physical items I1, I2 and can further update and monitor the total risk values over time. As a consequence, changes in the risk values over time can be detected.

The control unit (CU) 120 of the control system 100 can communicate with the production equipment 200 via the second interface 192. Any interface technology which is suitable to transfer control data from CU 120 to the production modules PM1 to PMn may be used for implementing the second interface 192. This also includes wireless communication interfaces with respective protocols. The CU 120 receives the PCD 311 with the production control data for the physical items I1, I2. It further receives from the risk evaluator 110 the information which physical item has the lowest total risk value. In the example, of FIG. 1, the particular item I1 has the lowest total risk value. In this example, the CU 120 initiates 1300, via the second interface 192 the execution of the operating instructions for manufacturing particular item I1 during the first operating time interval OTV1.

In one embodiment, the risk evaluator 130 may provide the entire risk ranking for the plurality of physical items to the CU 120 and the CU 120 selects the item with the lowest total risk value for production. In an alternative embodiment, the risk evaluator 110 already performs the filtering of the risk ranking and only provides the item with the lowest total risk value to the CU 120.

In one embodiment the CU 120 may then query the data provisioning module 310 to retrieve the PCD 311 for the item I1 with the lowest risk value. In an alternative embodiment, the CU 120 may have a cache memory for storing PCD 311 for potential items to be manufactured by the production equipment. In the alternative embodiment the CU 120 may simply select the cached PCD data which correspond to the item I1 with the lowest total risk value. The CU 120 may further include a transformation module which can transform the production control data received from the data provisioning module 310 into a format which can be processed by the various production modules of the production equipment 200.

If the risk evaluator 110 detects 1400 a change in the determined total risk values which results in an alternative item I2 having the lowest total risk value, or if the change of the total risk value associated with the particular item I1 exceeds a predefined threshold value, the CU 120 initiates termination of the execution of the operating instructions for processing (e.g. manufacturing) the particular item I1. Particularly, if the risk evaluator 110 detects 1400 a change in the determined total risk values Which results in an alternative item I2 having the lowest total risk value and results in a difference between said total risk value of the alternative item I2 and the updated total risk value of the particular item I1 exceeding a predefined threshold difference value, the CU 120 initiates termination of the execution of the operating, instructions for processing (e.g. manufacturing) the particular item I1. "Updated" in relation to the "total risk value of the particular item" means "updated through said change in the determined total risk values". For example, in the first scenario, the change in the determined total risk values results in an alternative item I2 having the lowest total risk value which is 30% and results in the particular item I1 having an updated total risk value of 32% (difference of both total risk values is 2%), and the predefined threshold difference value is delta=15%, in this scenario CU 120 will not initiate termination of the execution of the operating instructions for processing the particular item I1. For example, in the second scenario, the change in the determined total risk values results in an alternative item I2 having the lowest total risk value which is 10% and results in the particular item I1 having an updated total risk value of 32% (difference of both total risk values is 22%), and the predefined threshold difference value is delta=15%, in this scenario CU 120 will initiate termination of the execution of the operating instructions for processing the particular item I1.

In other words, once the risk evaluator updates the total risk values for the plurality of physical items and a change is detected so that after the change the particular item I1 is not associated with the lowest total risk value any more, the CU 120 sends operating instructions to the production equipment causing the corresponding production modules to terminate the manufacturing of the particular item I1 (i.e., initiates 1500 termination of the execution). For example, in a standard control mode, this may occur at the end of the first operating time interval OTV1 (i.e., when the production batch for the item I1 is completed). However, in some implementations (e.g., in an emergency control mode), the operating instructions may cause the production equipment 200 to immediately stop production of the particular item I1 even before the end of the first operating time interval. In some embodiments, such a change may only be detected by the risk evaluator if the change of the total risk value exceeds a predefined tolerance range (e.g., defined by threshold value(s)). That is, minor changes of the total risk value may be ignored by the control system in that no corrective action is triggered.

Once the production of the particular item I1 has been terminated by the production equipment 200, the CU 120 initiates 1600, via the second interface 192, execution of the operating instructions for processing (e.g. manufacturing) the alternative item I2 during a second operating time interval OTV2. In other words, the production is automatically switched to the alternative item I2 which now has the lowest total risk value. If the detection of a change depends on the predefined tolerance range, in cases of minor changes of the total risk value below the respective threshold value(s) the control system will not switch the production equipment towards the production of the alternative item I2. Advantageously, the predefined tolerance range is chosen in such a way that a significant advantage as a result of the production switching is achieved only if total risk value changes exceed the predefined threshold value(s).

It is to be noted that the alternative item I2 can be a variant of the particular item I1 where one or more of the components of I1 are replaced by substitute components associated with lower risk values. In such a scenario, the change of the total risk value for the particular item is associated with risk contributions of one or more of its components. The control unit 120 may then identify for the particular item one or more alternative components as substitutes with lower risk value contributions by searching for components with at least one similar or very similar structure function and/or technical feature in a corresponding database. At least one of the one or more particular components may then be replaced with an identified alternative component so that the total risk value of the modified particular item (i.e., alternative item I2) becomes the lowest total risk value of all items.

In one embodiment, the risk evaluator 110 has a first sub-module (IRA) 111 to determine partial risk values comprising IP risk values which are related to existing IPL objects regarding the physical items I1, I2 and their respective components. It further has a second sub-module (NIRA) 112 to determine partial risk values comprising non-IP risk values regarding the physical items I1, I2 and their respective components. The risk evaluator 110 can then aggregate the partial risk values provided by sub-modules IRA 111 and NIRA 112 into total risk values for the respective physical items.

For example, for computing IP risk values the IRA sub-module 111 may retrieve via the first interface 191 IPL-object-related information from one or more IP databases 320. The IP databases 320 may include public databases, such as for example, the ESPACENET database provided by the European Patent Office or the PATENTSCOPE database provided by the World Intellectual Property Organization. Such IP databases advantageously include legal status information regarding patents as well as public information on patent specifics, patentee specifics, country specifics, technology area specifics. Advantageously, public IP databases are regularly updated. The IP databases 320 may also include private internal databases of the entity which operates the production equipment or which provides the risk evaluation service. Internal IP databases may include additional information including non-public information on patent specifics, patentee specifics, country specifics, technology area specifics, likelihood of detection etc. Advantageously, they are regularly updated, too.

For computing non-IP risk values, the NIRA sub-module 112 may retrieve the information relevant for the computation from one or more non-IP databases 330. Example of non-IPL-object-related risk factors are technical risks, commercial and/or financial risks, EHS (environment, health and safety) risks—including risks related to toxicity, pathogenicity, electromagnetic radiation, particle radiation and acoustic radiation—, IT related risks (data loss or misappropriation) etc. Real, historic or forecast data on the commercials of the relevant product/service, such as amounts, prices, customers, earnings, net present values etc., may also be included in the computation of the commercial and/or financial risk. For example, if a high commercial value can be expected for the relevant product/service, then the value for the commercial and/or financial risk is rather low. For example, if very little commercial value can be expected for the relevant product/service, then the value for the commercial and/or financial risk is rather high. Therefore, the automatic calculation of the of non-IP risk values may include an integrated cost of change calculating tool (CCC) for calculating costs and risks related to the change in the operation mode (e.g. cost for switching the machine on and off to enable the production of the alternative item). Again, the non-IP databases may be public databases (e.g. public price lists for commodities) or private internal databases of the respective entity. Examples of internal private databases are databases of ERP systems including regularly updated non-public information on the commercials of the relevant product/service, such as amounts, prices, customers, earnings, net present values etc.

For example, the IRA sub-module 111 may compute a partial IP risk value based on status information of a corresponding IPL object in the one or more IP databases 320. If the status information changes after a first IP risk value computation for a particular item/component it may cause a change of the IP risk value in a second IP risk value computation after the status change. The change of the partial IP risk value may lead to a change of the total risk value of the particular item (if not compensated by other changes) which finally can lead a situation where another item has a lower risk value.

The IRA sub-module 111 may be operated by a computer program and/or by a human operator. In one embodiment, it is operated by a computer program. In another embodiment, it is operated by a computer program and by a human operator. In a further embodiment, it is essentially operated by a computer program only which is assisted by a human operator only in some exceptional circumstances. The IRA sub-module 111 includes a data input interface and a data output interface. Through the data input interface, the IRA sub-module 111 may receive data, such as for example: (i) non-public input information on the target item of which the IP risk should be assessed (ii) the countries of interest (non-public input), e.g. the countries where the target item may enter the market (iii) the likelihood of detection of a potential infringement (non-public input) (iv) other data related to the IP risk assessment (non-public input)

The IP databases 320 may include a public part and a non-public part which contain all necessary information for the computation of the IP risk assessment parameters (also referred to as "IP risk factors") needed for the computation of the partial IP risk values. In the following some examples for potential IP risk factors are given:

a) IP risk factors based on publicly available information in a patent description and/or claims. This may be obtained through automatic or semi-automatic claim mapping (see for example Claimbot™ or ClaimScape™ software from Lucid Patent, LLC., Minneapolis, USA) and/or semantic search of the target item according to the information (i) as provided above. For example, the target item may be described in terms of its technical features and the similarity degree of a semantic search result can be used for the computation of the risk value. A higher similarity may be associated with a higher IP risk. Semantic search tools are commercially available. One example is the tool Sem-IP provided by infoapps GmbH, Munich, Germany.

b) IP risk factors based on publicly available information on the patent apart from the patent description and/or claims, including but not limited to: legal status of the patent (pending, granted, opposed, revoked, expired); patent torn (if patent will expire soon, then the risk is lower), number of third party actions related to this patent (i.e. third party observations/submissions; opposition and invalidity proceedings before the patent office or other offices); duration of pendency in case of granted patents (i.e. granted within x months after filing); number of office actions received until the grant of the patent; size and/or country coverage of the patent family (e.g.; automatically retrieving patent family information from ESPACENET database provided by the European Patent office or from the Indian patent office files if the size of the patent family is untypical for the patentee for example, if a multinational patentee files the patent only in one country, or if a small Chinese university files a patent in 10 countries worldwide); whether the patent can be licensed to everyone for a flat fee; number of forward citations; IPC class of the patent (for example, the risk of a patent to be invalidated might be higher for patents granted in the years 2000 to 2010 in specific IPC classes, due to the changing country specific case law, e.g. Alice or Mayo Supreme Court decisions in the US).

c) IP risk factors based on publicly available information on the patentee, including but not limited to: the legal form of the patentee (private company, public institutions such as universities, government bodies, private person); relationship between patentee and the entity producing the items; whether the patentee is litigious or enforcing its patents in general (information from public sources); country of origin of the patentee; size and "financial power" of the patentee; whether the patentee has made a public non-assert declaration; whether the patentee is a non-practicing entity (NPE); whether a change of the patentee occurred.

d) IP risk factors based on non-public information on the patent, including but not limited to: whether an invalidity analysis has been made; whether novelty-destroying prior art is known related to the patent; whether the patent has been monitored; whether there is a license option or similar agreement regarding this patent; specific experience with the patent examiner who has examined the patent.

e) IP risk factors based on non-public information on the patentee including but not limited to: quality of the relationship between patentee and the user (i.e. friendly relationship collaboration partner/hostile relationship/competitor; supplier/customer relationship); whether the patentee is litigious or enforcing its patents in general; whether it is easy to negotiate a contract with the patentee; general quality of the patent filings of the patentee f) IP risk factors based on public or non-public country specific information (e.g. trends in case law): in some countries, patentees can hardly enforce their patents (e.g. India); in other countries such as Brazil, it may take up to 10 years until the patent is granted; In Europe (EP), software patents would need technical character for the inventive feature; in other countries such as US, infringers often need to pay high damages after court proceedings.

g) IP risk factors based on public or non-public technology specific information: For example, in the sector, a higher risk may be acceptable than in traditional sectors such as chemistry; for example, this may be related to the corresponding IPC classes.

h) IP risk factors based on the likelihood of detection of a potential infringement (non-public): E.g., the target product/service, is not visible, its components cannot be analysed ("black box").

The above IP risk factors can be used for the computation IP risk values for particular item(s) according to predefined schemes and rules. Such rules may be predefined or may be configured by the entity producing the particular item(s).

A total IP risk value for a particular item can be computed based on a weighting of at least a subset of the above IF risk factors. For example, the entity "MASTERCOMPANY" operating the production equipment may produce a physical item "MASTERADDITIVE" which is a chemical product. The IRA sub-module 111 may receive the following information as input: Countries of interest: only US IP risk factor for a) as above: 70% (e.g, obtained through 70% similarity degree of a corresponding semantic search compared to the claim language); weighting factor (predefined): 20% IP risk factor for b) as above: 90% (e.g., the only relevant patent is granted and there is no third party action pending against this patent; according to the IPC class there is a low probability that the patent is invalid because of corresponding case law in US); weighting factor (predefined): 20% IP risk factor for c) as above: 10% (e.g., the patentee of the only relevant patent is the University "MASTERUNI", which is willing to provide licenses according to public records); weighting factor (predefined): 10% IP risk factor for d) as above: 5% (e.g., an internal invalidity analysis has been made which is entered in the non-public part of the IP databases 320); weighting factor (predefined): 20% IP risk factor for e) as above: 10% (e.g., there is good collaboration between "MASTERCOMPANY" and "MASTERUNI"); weighting factor (predefined): 10% IP risk factor for f) and g) as above, combined: 50% (e.g., no special situation in the US for patents on chemicals); weighting factor (predefined): 10% IP risk factor for h) as above: 80% (e.g, the contents of "MASTER ADDITIVE" can be analyzed with existing technology); weighting factor (predefined): 10% The total IP risk value for the item "MASTERADDITIVE" can then be computed as: $0.7*0.2+0.9*0.2+0.1*0.1+0.05*0.2+0.1*0.1+0.5*0.1+0.8*0.1=0.48=48\%$. This IP risk value for the item "MASTERADDITIVE" may then be aggregated by the risk evaluator 110 with the partial risk value provided by the NIRA sub-module 112 into a total risk value for the item. The total risk value may also be transformed into a monetary value by taking into account the estimated commercial value for the item.

Smart risk assessment tools, such as the risk evaluator 110 with the RA and NIRA sub-modules, may be extended by further sub-modules directed to the computation of further partial risk values in relation to, for example, commercial and/or financial risks, EHS (environment, health and safety) risks—including risks related to toxicity, pathogenicity, electromagnetic radiation, particle radiation and acoustic radiation—, IT related risks (data loss or misappropriation of data). Thereby, such sub-modules become integrated with automatic control units, such as for example the CU 120, used for the control of processes, such as for example, manufacturing, treatment, analysis/testing/screening, (incl. high-throughput screening), supply chain, procurement, sales, software release, R&D, simulation processes, which may be affected by said risk factors.

In the example of FIG. 1, the risk evaluator 110 is communicatively coupled with the CU 120. In an embodiment where the control system 100 is not distributed, the communicative coupling may be implemented via an internal bus of the control system 100. In distributed implementations the communicative coupling may be implemented via any appropriate Wide Area Network (WAN), Local Area Network (LAN), or Wireless Local Area Network (MAN) connection. The risk evaluator 110 provides the risk information to the CU 120 which is need to transmit the operating instructions to the production equipment which ensure that only items are produced which are usable afterwards. In the previously disclosed examples, the risk evaluator 110 received input information from the databases 320, 330 and optionally from the data provisioning module 310 (e.g., the name and the chemical structure of the item).

The risk evaluator 110 may also receive input from the CU 120. For example, the actual composition of the item "MASTERADDITIVE" may have changed in the production process during operating time interval OTV1 because the manufacturing process may have changed. As result, the item may be actually produced according to a specification which deviates from the original specification included in the production control data PCD 311. The CU 120 may also perform a monitoring function on the production equipment 200 and recognize such a change (e.g., by receiving appropriate sensor data monitoring the status of the various production modules PM1 to PMn). The CU 120 may then provide the actual composition to the risk evaluator 110 which can compute an updated total risk value for the actually produced item. The updated total risk value for the currently produced item may have changed in such a way that an alternative item has a lower risk value. In this case, the CU 120 may provide operating instructions to the production equipment to switch the production to the alternative item for the next operating time interval OTV2.

Further, the IRA sub-module 111 may include functions to support the generation of claim mapping or similarity values for semantic searches depending on the target item. Further, predefined IP or patent searches and filters can be set (e.g., depending on the output of CU), and/or machine learning may be implemented to improve the quality of the output.

FIG. 3 is a table 3000 which illustrates an example of control system behavior for regularly updated total risk values of a currently produced item (e.g., "MASTERADDITIVE"). The risk evaluator may perform update computations for the total risk values on a regular basis. For example, the update intervals may be monthly, weekly, daily, hourly, per second, or even in real time. It is assumed that in the example the risk evaluator automatically computes total risk value updates hourly. The total risk value column of table 3000 shows threshold values for the total risk value of the currently produced item. The operating instructions column includes information regarding the operating instructions which are sent by the CU 120 to the production equipment in case the actual total risk value exceeds the respective threshold value.

In the example, the control mode 1 is associated with all total risk values up to 40%. That is, any change of the total risk value which is resulting in a total risk value in the tolerance range 0% to 40% is ignored by the control system. The control system does not treat changes within the tolerance range as relevant changes and therefore no further action is taken and the manufacturing process is not changed.

However, once a change is detected in that the total risk value exceeds the 40% threshold value, the CU activates control mode 2 which includes sending a notification about the current risk status. In other words, the control system notifies a respective target (e.g., a monitoring system or a human operator) about the detected change. Otherwise, the control system does not automatically trigger any further corrective action.

However, once a change is detected in that the total risk value exceeds a 60% threshold value, the CU activates control mode 3 which may include, changing the manufacturing process to a predefined alternative process (design-around solution) for producing an alternative item during a future operating interval. This may include the use of a low risk substitute component instead of a high risk component provided that the total IP risk value of the alternative item is not >40%. The control system further sends operating instructions to the production modules to prepare for the switch event to switch to the substitute component. The system also sends a notification about the current risk status to a respective target.

Once a change is detected in that the total risk value exceeds an 80% threshold value, the CU activates control mode 4 which may include terminating the manufacturing process after completion of the current operating time interval (e.g., within one day) and preparing for the switching event. It may be advantageous to select an updating frequency for the determination of risk changes which is higher than the frequency at which switching events can occur. This ensures that any risk re-evaluation including recent risk changes can be taken into account by the control system before a switching instruction is sent to the production equipment. The system also sends a notification about the current risk status to a respective target.

Once a change is detected in that the total risk value exceeds a 90% threshold value, the CU activates control mode 5 (emergency mode) which may include terminating the manufacturing process during the current operating time interval (e.g., within one hour) and prepare for the switching event. The system also sends a notification about the current risk status to a respective target.

The same or similar scheme as shown in FIG. 3 may also be applied to other risk relevant processes such as treatment, analysis/testing/screening (incl. high-throughput screening), supply chain, procurement, sales, software release, R&D, and simulation processes.

In one embodiment, in any one of the above control modes 2 to 5, die CU may send a request for automatic patentability/validity assessment to the IRA sub-module for the most relevant patents regarding currently produced item.

In one embodiment, the CU is configured in a way that it automatically searches for design-around options in interaction with the risk evaluator and selects the one with the best total risk value.

In one embodiment, the CU is configured in a way that maintenance actions for one or more production modules are scheduled after the manufacturing process is stopped (control modes 4 and 5 with termination operating instructions). In this case a public notification about the maintenance state of the respective production module (e.g., "the system . . . is now maintained . . . ") is automatically published by output means (e.g., monitor, touch screen, audio output, etc.) of the control system, and/or sent to the operator(s) of the respective production modules.

In the following, some more example scenarios are explained to illustrate the application of the inventive concept of the automatic risk based production control system.

A 3rd party patent (e.g., patent EP9999999) is monitored by the risk evaluator (IRA sub-module). The patent has been granted in EP with the relevant claim 1, and a particular item in production mode (i.e., the item is either already in production or it is scheduled for production) would infringe the relevant claim 1. The IRA sub-module detects a trigger event in this situation which requires a risk evaluation with the following, steps:

a) automatic search of prior art useful for invalidating the relevant claims of EP9999999 (e.g. using tools such as Google Prior Art Finder);

b) automatic relevance check of the prior art found in step a), e.g., by assessing the similarity degree of the semantic prior art search compared to the wording of claim 1 of EP9999999;

c) depending on the result of the relevance check in step b), IRA adjusts the corresponding IP assessment parameters (IP risk factors) accordingly which leads to a change in the total IP risk value of the particular item. For example, if the prior art found in step a) is regarded as highly relevant or novelty destroying by IRA the corresponding IP assessment parameters remain unchanged or nearly unchanged after the grant of EP9999999. For example, if no prior art has been found in step a), the corresponding IP assessment parameters win significantly change after the grant of EP9999999, which may lead to a significant change (e.g., increase) of the total IP risk value.

Figure 5:
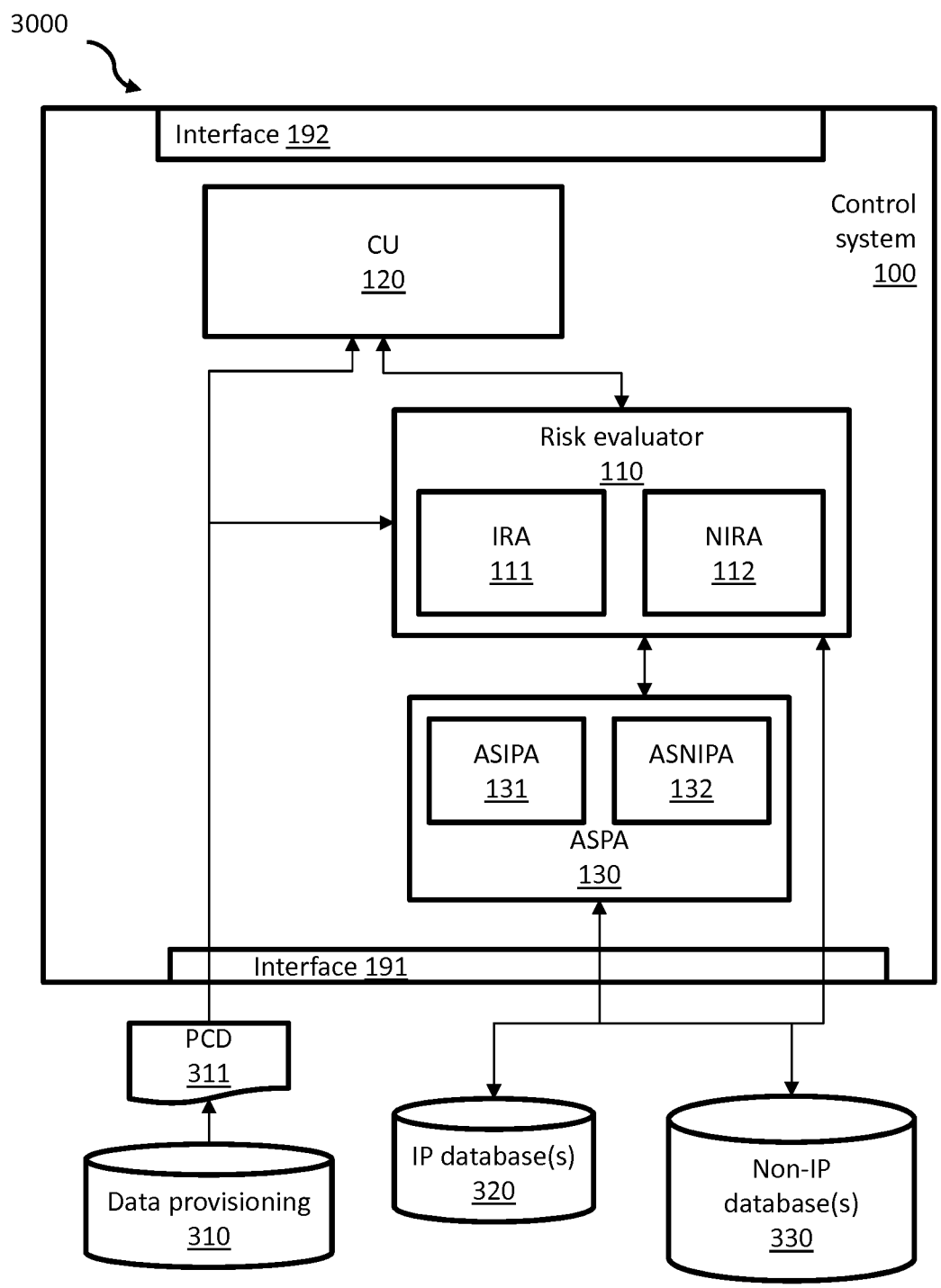
FIG. 5 is a simplified component diagram of the control system including the optional automatic search module according to an embodiment of the invention.

FIG. 5 illustrates an embodiment of the control system 100 further including a module 130 which is configured to perform an automatic search for alternative items to be processed (ASPA). The ASPA module 130 may have a sub-module 131 which is configured to perform automatic searches for IPL-object-related alternatives (ASIPA) and a further sub-module 132 to perform automatic searches for non-IPL-object-related alternatives (ASNIPA). A person skilled in the art is able to use known search technologies in combination with respective databases to retrieve the relevant information needed for the decision of the control system to automatically switch manufacturing to an alternative item.

The ASIPA sub-module 131 can output one or more alternative solutions for production items (referred to as "ASIPA solutions" in the following). These ASIPA solutions can be evaluated by the IRA/NIRA sub-modules 111, 112 regarding their associated IP/non-IP risks. For example, for evaluating the non-IF risks such as technical risks (e.g., technical feasibility of an item), optionally NIRA 112 can be communicatively coupled to an automatic quick screening or testing equipment, wherein the quick screening or testing results can be transformed to technical risks or non-IP risks. The total risk value is computed based on the IP risk value and the non-IP risk value for the respective alternative solution. If one ASIPA solution leads to a better total risk value than the current solution which is in the production mode (i.e., the item currently being produced or scheduled for production), then the risk evaluator may output a signal to the CU to switch the manufacturing process from the current solution to this ASIPA solution.

The ASNIPA sub-module 132 may perform an automatic search for alternatives without considering any IPL-object-related matters. For example, ASNIPA may search for technical alternatives, and can be communicatively coupled (e.g., via the NIRA sub-module 112) with an automatic quick screening or testing equipment to determine the technical feasibility of identified alternatives. These ASNIPA solutions can be evaluated by the IRA/NIRA sub-module regarding the IP/non-IP risks. Again, the total risk value of an identified alternative solution is computed based on the IP risk value and the corresponding non-IP risk value. If an identified ASNIPA solution has a better total risk value than the current solution which is in the production mode, then the risk evaluator may output a signal to the CU to switch the manufacturing process from the current solution to the identified ASNIPA solution.

Figure 4:
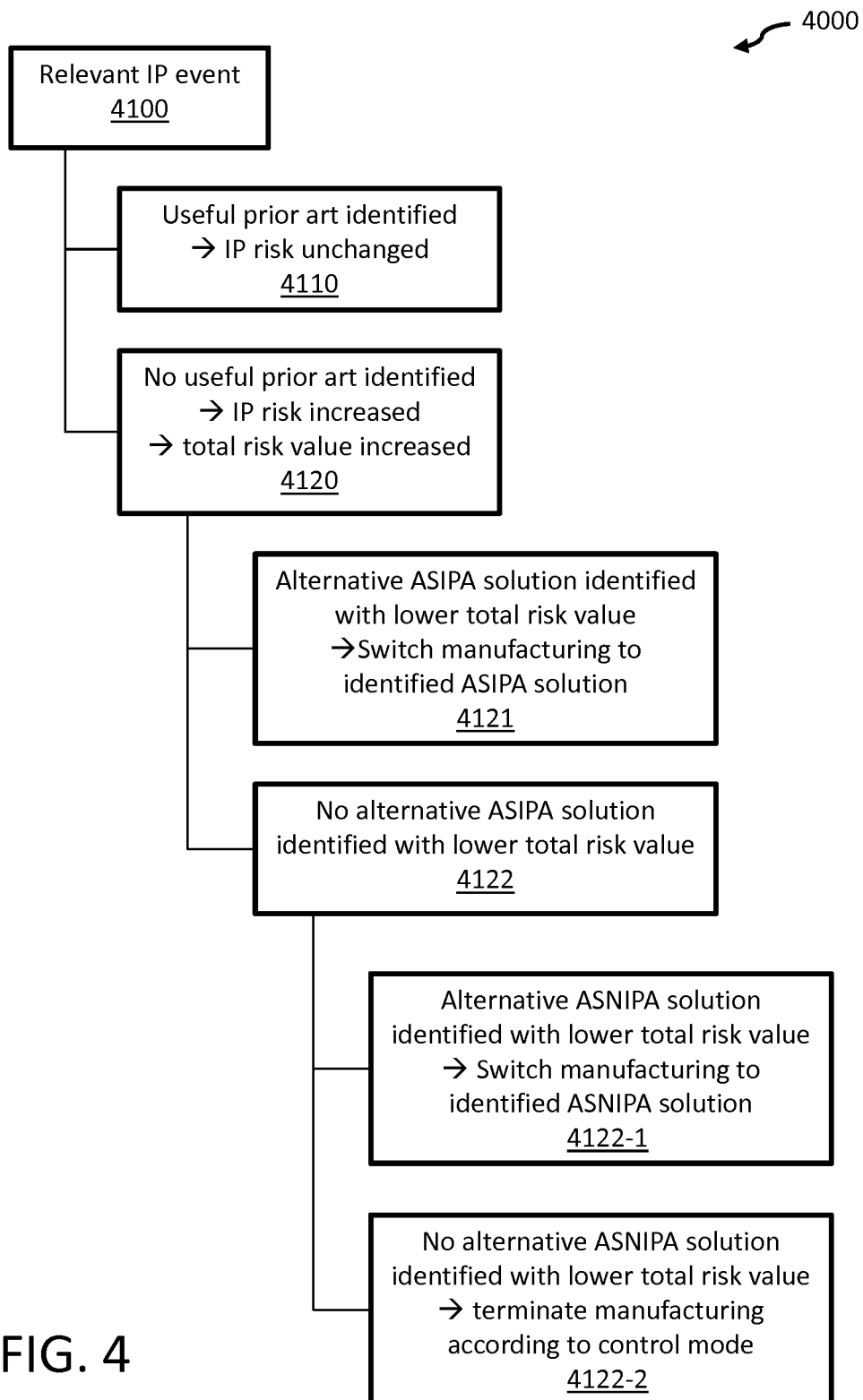
FIG. 4 illustrates is a decision tree example which may be used to control the function of an optional automatic search module according to an embodiment of the invention.

FIG. 4 illustrates a decision tree 4000 which may be used to control the function of the optional ASPA module 130. A relevant IPL-object-related event is detected 4100 by the risk evaluator. For example, a patent is granted which has a relevant claim with regards to the current (currently manufactured or scheduled) item.

The risk evaluator can then use its automatic search function to identify (via appropriate search tools) if there is useful prior art which may invalidate the relevant claim. If this search is successful and useful prior art is identified 4110 the IP risk for the current item may remain unchanged. If no useful prior art can be identified 4120 the respective partial IP risk value for the current item increases. As a consequence, if no further risk compensation occurs also the total risk value for the current item increases. The control system may now use the optional ASIPA sub-module to search for alternative solutions with a lower total risk value than the total risk value of the current item. If such an alternative ASIPA solution can be identified, the CU may send operating instructions to the production equipment to switch 4121 manufacturing from the current item to the identified ASIPA solution. However, the search for an alternative ASIPA solution may fail 4122. In this case the ASNIPA sub-module may be used to search for alternative ASNIPA solutions with a lower total risk value than the total risk value of the current item. If an alternative ASNIPA solution can be identified the CU may send operating instructions to the production equipment to switch 4122-1 manufacturing from the current item to the identified ASNIPA solution. If no alternative ASNIPA solution can be identified the CU may send operating instructions to the production equipment to terminate 4122-2 manufacturing according to the control mode associated with the current total risk value (e.g., normal operation or emergency situation, cf. FIG. 3).

Where a relevant claim in an IPL object, particularly an IPR object or a patent, and/or a relevant subject-matter which has or can be claimed in an IPL object, particularly an IPR object or a patent, contains:

(1) limitations on specific item, compound, structure, material, component and/or substance class [these limitations are referred to as "(Li1)"], and/or (2) limitations on specific ranges, physical parameters, non-physical parameters, physical parameter ranges and/or non-physical parameter ranges [these limitations are referred to as "(Li2)"], and/or (3) limitations on specific process, method, step, and/or step sequences [these limitations are referred to as "(Li3)"], and/or (4) limitations on specific use and/or purpose [these limitations are referred to as "(Li4)"], and/or (5) specific conditional limitations [these limitations are referred to as "(Li5)"] such as a conditional limitation that a limitation on a specific item, compound, structure, material, component, substance class, ranges, physical parameters, non-physical parameters, physical parameter ranges, non-physical parameter ranges, process, method, step, step sequences, use, purpose is only applicable when a specific condition is met, and/or (6) limitations in a way that specific exceptions and/or disclaimers are not included in the claim in the IPL object and/or in the subject-matter which has or can be claimed in the IPL object [these limitations are referred to as "(Li6)"], and/or (7) limitations which have not been included in the set of claims as originally filed and/or as previously filed for the IPL object [these limitations are referred to as "(Li7)"], and/or limitations which have not been included in the corresponding independent or higher-ranked claim, wherein the corresponding independent or higher-ranked claim has been regarded as invalid, most likely invalid or likely invalid by the risk evaluator [these limitations are referred to as "(Li8)"], the ASIPA sub-module can automatically identify these limitations and automatically search for alternative solution which do not fall under the identified limitations among the limitations (Li1), (Li2), (Li3), (Li4), (Li5), (Li6), (Li7) and/or (Li8).

The term "relevant" in combination with claims or subject-matter which has or can be claimed means that the claim or subject-matter has an impact on the total risk value or IP risk value which exceed a specific, e.g. predefined, threshold value.

The term "alternative solution" means alternative item, compound, structure, material, component, substance class, ranges, physical parameters, non-physical parameters, physical parameter ranges, non-physical parameter ranges, process, method, step, step sequences, use, and/or purpose.

In case the ASIPA sub-module has identified limitation (Li7), ASIPA sub-module will also primarily automatically search for alternative solution in the "delta area", i.e. in the difference area, between (a) the relevant claim and/or subject-matter and (b) the set of claims as originally filed and/or as previously filed for the IPL object.

In case ASIPA sub-module has identified limitation (Li8), ASIPA sub-module will also primarily automatically search for alternative solution in the "delta area". i.e., in the difference area, between (a) the relevant claim and/or subject-matter and (b) the corresponding independent or higher-ranked claim which has been regarded as invalid, most likely invalid or likely invalid by the risk evaluator.

The following scenario examples explain in detail the functioning of the ASPA module and, in particular, its ASIPA sub-module. General assumptions for all the below scenarios are summarized as:

A current item is produced with an exemplary composition: "90 wt. % ethanol (representative of the class of alcohols)+8 wt. % acetic acid (representative of the class of carboxylic acid)+2 wt. % glucose (representative of the class of monosaccharide sugar)" and is used as a floor cleaning agent. National rules or jurisdiction on the question of equivalence and of claim interpretation are considered by ASIPA. For example, for Germany, ASIPA takes into account the case law based on the Gelman Federal Court decisions "Okklusionsvorrichtung" (BGH, X ZR 16/09), "Diglycidverbindung" (BGH, X ZR 69/10) and "Schneidmesser I" (BGH, X ZR 168/00).

Scenario 1: The relevant claim in the granted 3rd party patent (e.g. EP9999999) contains specific compound/structure/component/class limitations. For example, the relevant claim reads "a composition comprising ethanol+carboxylic acid+monosaccharide sugar", ASIPA can automatically recognize that the claim contains a specific compound limitation on the alcohol part and automatically searches for alternative alcohols instead of ethanol, either through a similarity search in a corresponding database or through a search in the text of EP9999999 or in other patent literature. For example, the search in a chemical structure database may identify methanol and propanol as structurally most similar alcohols to replace ethanol. A search in the patent literature may find that in the original patent application of EP9999999, the claim reads "ethanol/propanol+carboxylic acid+monosaccharide sugar" and may further find in other patent literature that ethanol can be replaced by propanol in such cases. A similarity search via web-based search engines (for example Google) may also be used to automatically identify potential substitute components for components covered by the relevant claim. The ASIPA sub-module can then output alternative solution recommendations such as: "ethanol to be replaced by methanol", or "ethanol to be replaced by propanol".

Scenario 2: The relevant claim in the granted 3rd party patent (e.g. EP9999999) contains specific range/physical parameter limitations. For example, the relevant claim reads "a composition comprising 88-92 wt. % ethanol+carboxylic acid+monosaccharide sugar". ASIPA automatically recognizes that the claim contains a specific range limitation on the alcohol part and will for example output alternative solution recommendations such as "90 wt. % ethanol to be replaced by 85 wt. % ethanol", or "90 wt. % ethanol to be replaced by 95% wt. % ethanol", or "90 wt. % ethanol to be replaced by 90 wt. % methanol", or "90 wt. % ethanol to be replaced by 90 wt. % propanol".

Scenario 3: The relevant claim in the granted 3rd party patent. (e.g. EP9999999) contains specific process/method/step/step sequence limitations. For example, the relevant claim reads "a composition comprising ethanol+carboxylic acid+monosaccharide sugar, wherein the monosaccharide sugar is first completely dissolved in ethanol". ASIPA may automatically recognize that the claim contains a specific process/step sequence limitation regarding the dissolution of the monosaccharide sugar and will for example output alternative solution recommendations such as: "Composition comprising 90 wt. % ethanol+8 wt. % acetic acid+2 wt. % glucose wherein glucose is first completely dissolved in acetic acid".

Scenario 4: The relevant claim in the granted 3rd party patent (e.g. EP9999999) contains specific use/purpose limitations. For example, the relevant claim reads "Use of a composition comprising ethanol+carboxylic acid+monosaccharide sugar as a carpet cleaning agent". ASIPA may automatically recognize that the claim contains a specific use/purpose limitation, will check the use of the produced composition and will for example output alternative solution recommendations such as: "The composition can only used for cleaning floor material other than carpets, for example laminate floor, wooden floor or tiled floor etc."

In case the use of the composition is printed on a label, ASIPA may for example trigger a process in which the label is changed by including the wording: "not to be used for the cleaning of carpets".

Scenario 5: The relevant claim in the granted 3rd party patent (e.g. EP9999999) contains specific conditional limitations. For example: The relevant claim reads "a composition comprising ethanol+carboxylic acid+monosaccharide sugar, wherein the monosaccharide sugar is glucose in case the carboxylic acid is acetic acid and the monosaccharide sugar is galactose in case the carboxylic acid is propionic acid". ASIPA may automatically recognize that the claim contains a specific conditional limitation and can, for example, output alternative solution recommendations such as: "acetic acid to be replaced by propionic acid", or "glucose to be replaced by galactose".

Scenario 6: The relevant claim in the granted 3rd party patent (e.g. EP9999999) contains specific exceptions/disclaimers. For example, the relevant claim reads "a composition comprising ethanol+carboxylic acid+monosaccharide sugar, wherein the carboxylic acid is not propionic acid". ASIPA may automatically recognize that the claim contains a specific exception/disclaimer and may, for example, output alternative solution recommendations such as: "acetic acid to be replaced by propionic acid".

Scenario 7: The relevant claim in the granted 3rd party patent. (e.g. EP9999999) contains specific limitations compared to the claims in the 3rd party patent application as originally filed. For example, the relevant claim reads "a composition comprising ethanol+acetic acid+monosaccharide sugar". The corresponding claim as originally filed reads "a composition comprising ethanol+carboxylic acid+monosaccharide sugar". ASIPA may automatically recognize that the relevant claim contains a specific limitation on the carboxylic acid part which has been introduced during patent prosecution and will for example output alternative solution recommendations directed to this claim limitation such as: "acetic acid to be replaced by formic acid", or "acetic acid to be replaced by propionic acid", ASIPA may primarily search for alternative solutions in the "delta area" (difference area) between the claim as originally filed and the relevant claim.

Scenario 8: The relevant claim in the granted 3rd party patent (e.g. EP9999999) is a dependent claim of a broader independent claim 1, wherein the independent claim 1 is regarded as invalid by the risk evaluator and the dependent claim is regarded as valid and relevant. The relevant dependent claim reads "a composition comprising ethanol-(acetic acid+monosaccharide sugar". The corresponding independent claim reads "a composition comprising ethanol+carboxylic acid+monosaccharide sugar". For example, the independent claim may be regarded as invalid by the risk evaluator based on a non-patent prior art reference (e.g., a prior art document accessible in one of the IP databases) disclosing "a composition comprising ethanol+propionic acid+glucose". ASIPA may automatically recognize that the relevant claim contains a specific limitation on the carboxylic acid part compared to the invalid independent claim and will for example output alternative solution recommendations directed to this claim limitation such as: "acetic acid to be replaced by formic acid", or "acetic acid to be replaced by propionic acid".

ASIPA may automatically check the reason why the corresponding independent or higher-ranked claim has been regarded as invalid by the risk evaluator, and in case the invalidity assessment was based on prior art references, ASIPA may analyse these prior art references. In case of a non-patent, prior art or a patent prior art wherein the corresponding patent has lapsed, expired or has been abandoned, ASIPA can mark the solution, i.e. composition, which is identical to the prior art solution (e.g. prior art composition) as the most preferred alternative solution (according to the rule of "Formstein-Einwand", BGH 29.04.1986 X ZR 28/85, in Germany).

Advantageously, ASIPA may primarily search for alternative solutions in the "delta area" (difference area) between the invalid dependent claim and the relevant valid dependent claim on the next level of dependency. In-licensing may be regarded as another solution in case no other alternative solution can be identified by ASIPA. In the computation of the IP risk values, the IRA sub-module may also check whether EP9999999 could be part of a licensing agreement which has already been concluded.

It is to be noted, that in all scenarios, where the ASPA module provides alternative recommendations, the risk evaluator in combination with the control unit will automatically select the alternative item with the lowest total risk value. If two or more alternative items have the same lowest risk values, one alternative is selected by the control system. The selection may be random or it may be based on other criteria, such as for example, the commercial potential of the alternative item, the efforts needed for switching the production, or other considerations, such as maintenance requirements or production modules, etc.

If the total risk value of the particular item exceeds a predefined threshold value and if all the alternative items as recommended by the ASPA module have a higher or not significantly lower total risk value than the particular item (I1), the control unit (120) will initiate the termination of the execution of the operating instructions of processing the particular item (I1), without initiating the execution of the operating instructions for processing the alternative item (I2). "Not significantly lower" means that the difference between the total risk value of the alternative item and the total risk value of the particular item does not exceed a predefined threshold difference value.

FIGS. 6A and 6B show two tables 610, 620 reflecting automatic production switches of the production equipment in response to operating instructions sent by the control unit CU of the control system based on results provided by the risk evaluator. The columns of the tables 610, 620 are defined as follows: t: time line of the production (in days) item: item number (I1 to I8) C1: component 1 C2: component 2 C3: component 3 RNIP: Non-IP risk value RIP: IP risk value Rt: total risk value PO L1: production output of production line L1.

In the examples, the chemical products I1 to I8 consist of components C1 to C3 of the structural/functional classes A, B and C. C1 can be the molecules A_1 or A_2 within the structural/functional class of A (as a specific example, C1 is an alcohol, A_1 is ethanol and A_2 is propanol). C2 can be the molecules B_1 or B_2 within the structural/functional class of B (as a specific example, C2 is a carboxylic acid, B_1 is acetic acid, B_2 is propionic acid). C3 can be the molecules C_1 or C_2 within the structural/functional class of C (as a specific example, C3 is a monosaccharide sugar, C_1 is glucose, C_2 is galactose). All the products/items I1 to I8 have the same technical properties.

In the example of FIG. 6A, it is assumed that the products/items I1 to I8 are predefined alternative products which can be produced by the production equipment (production line L1) in case the risk for at least one of the products changes. Thereby, it is assumed that production line L1 can only produce one product on the same day. On Day 0, the risk evaluator computes the risk values for the items I1 to I8 to plan the production for Day 1. In the example, the total risk value Rt is computed as: Rt=0.5*RNIP+0.5*RIP. The lowest total risk value is computed for item I1: Rt(I1)=15% having an RNIP value of 10% and a RIP value of 20%. Therefore, item I1 is scheduled for production on Day 1.

Production starts on Day 1 according to the operating instructions received from the control unit CU on the basis of the total risk values. The risk evaluator may re-compute all risk values for the items I1 to I8 before the production starts and update the risk values periodically. In the example, all risk values remain unchanged. Production on line L1 starts for item I1 which is still the item with the lowest total risk value. Because L1 can only produce one item at a time the production output of L1 for item I1 is 100%.

On Day 2, either before or after L1 starts production of I1, the risk evaluator recognizes that 3rd party patent EP9999999 with claim 1 claiming the combination of "A_1+B_1+C_1 and A_1+B_1+C_2" in such products has been granted in Europe (EP). The IRA sub-module can retrieve this information from a status change of the respective data file for patent EP9999999 in a public IP database (e.g., the file inspection database of the European Patent Office). On the basis of the received status information and the granted claim the risk evaluator may also perform a validity assessment for the granted claim 1 of EP9999999. In the example, the risk evaluator computes a validity probability higher than 50% according to pre-defined validity assessment rules. This leads to an increase of the IP risk value RIP from 20% on Day 1 to 70% on Day 2 for the affected products I1 and I3. The RNIP values remain unchanged resulting in total risk values Rt of 40% and 55% for the items I1 and I3, respectively. Also the total risk values of the other items do not change. In this example, the production output PO L1 for I1 on Day 2 remains unchanged because the increase of the total risk value by 25% does not trigger an emergency control mode requiring immediate termination of the production. The item with the lowest total risk value Rt of 20% is now Item I2. Therefore, the control unit CU prepares for switching the production of L1 to I2 in the control mode based on the new total risk values provided by the risk evaluator. This may include a computation of the cost of the production switch with an integrated cost-of-change calculating tool (CCC).

On Day 3, the risk evaluator confirms the total risk values which were computed for the products I1 to I8 on Day 2. According to the CCC calculation of the, there is no extra cost or risk related to the production switch from I1 to I2. Therefore, on Day 3, the CU initiates the production switch from I1 to I2 and the production equipment L1 is now operated according to the operating instructions received from the control unit resulting in a 100% production output of L1 for item I2.

In the example of FIG. 6B, it is assumed that item I1 is the product which will be produced by L1. No alternative products have been predefined which could be produced by L1 in case the total risk value for I1 increases beyond a predefined threshold value requiring a termination of the production of I1. Again, in the example, the production line L1 can only produce one product on the same day.

During the planning phase on Day 0, the risk evaluator computes the total risk value Rt for the product I1 as 15% based on the RNIP value of 10% and the RIP value of 20%. As item I1 is the only product is of course also the item with the lowest total risk value and is therefore scheduled for production on L1 for the next day.

On Day 1, before or after the start of the production, the risk evaluator re-computes the risk values for the item I1 and determines that all risk values remain unchanged. Production output for I1 on L1 is 100% on Day 1, accordingly. Later during Day 1, a status change in a public IP database indicates that the 3rd party patent EP9999999 with claim 1 claiming the combination of "A_1+B_1+C_1 and A_1+B_1+C_2" in such products has been granted in EP. The IRA sub-module retrieves this information (e.g., via a periodically scheduled scan of status information regarding patents included in an IP or patent monitoring list) and can perform a validity assessment for claim 1 of EP9999999. Based on this assessment, the risk evaluator computes an increase of the total IP risk value from 20% to 70% for the affected product I1. Thereby, the computation of RNIP value remains unchanged. The total risk value increase by 25% triggers a control mode which requires a switch of production but no immediate termination of the production of I1.

Therefore, on Day 2, the production output of L1 is still 100% for product I1 as no alternative items are available. However the control system can now use the ASPA module to search for alternative products. For example, on Day 2, the ASIPA sub-module may identify the items I2 to I8 as alternative ASIPA solutions to replace I1 in the production process. The risk evaluator performs the risk value computations for the identified alternative products and identifies product I2 as the product with the lowest total risk value Rt (20%). As the total risk value for I1 does not change, I2 is now the product with the lowest total risk value which is scheduled for production on the next day (Day 3). This may include again a computation of the cost of change with the integrated CCC tool. In the example, production output of L1 on Day 2 remains unchanged (100% for I1) while the CU prepares for switching the production from I1 to I2 based on the computed total risk values.

On Day 3, the risk evaluator confirms the total risk values for the products I1 to I8 from Day 2. Further, the OCC determines that there is no extra cost or risk related to the switch from I1 to I2. As a consequence, on Day 3, the CU initiates the production switch from I1 to I2 and the production equipment L1 is now operated according to the operating instructions received from the control unit resulting in a 100% production output of L1 for item I2.

The following listing of embodiments illustrates further variants of the invention.

Embodiment X1: A control system (100) for controlling a process performed by production equipment (200), comprising: a first interface (191) configured to obtain, from a data provisioning module (310), process control data (311) for operating the production equipment (200) wherein the process control data (311) relates to operating instructions configured to control the production equipment (200) to automatically process one or more physical items (I1, I2) and their respective components (C1 to Cn); a risk evaluator module (110) configured to determine for each item a total risk value based on partial risk values associated with the respective components (C1 to Cn), and further configured to detect a change in the determined total risk values; a control unit (120) configured to: initiate, via a second interface (192), execution of the operating instructions for processing a particular item (I1) having the lowest total risk value of the determined total risk values during a first operating time interval (OTV1); initiate termination of the execution of the operating instructions for processing the particular item (I1) if the change in the determined total risk values results in an alternative, item (I2) having the lowest total risk value, or if the change of the total risk value associated with the particular item (I1) exceeds a predefined threshold value; and initiate, via the second interface (192), execution of the operating instructions for processing the alternative item (I2) during a second operating time interval (OTV2) if the change in the determined total risk values results in the alternative item (I2) having the lowest total risk value.

Embodiment X2: The control system (100) of embodiment X1, wherein the alternative item (I2) is physically identical to the particular item (I1) and the process applied to the alternative item (I2) is different from the process applied to the particular item (I1).

Embodiment X3: The control system (100) of embodiment X1, wherein the alternative item (I2) is physically different from the particular item (I1).

Embodiment X4: The control system (100) of embodiment X1, wherein the change in the determined total risk values results in an alternative item (I2) having the lowest total risk value and results in an difference between said total risk value of the alternative item (I2) and the updated total risk value of the particular item (I1) exceeding a predefined threshold difference value.

Embodiment X5: The control system (100) of any one of the embodiments X1 to X4, wherein the alternative item (I2) complies with a product specification of the particular item (I1) in that the alternative item performs a similar function or a very similar function or the same function as the particular item (I1).

Embodiment X6: The control system (100) of any one of the embodiments X1 to X5, wherein the risk evaluator module (110) is further configured to determine the total risk value based on partial risk values comprising IP risk values related to existing IPL objects regarding the physical items and/or their respective components, and/or based on non-IP risk values regarding the physical items and/or their respective components.

Embodiment X7: The control system (100) of any one of the embodiments X1 to X6, particularly X1, X4, or X5, wherein the risk evaluator module (110) is further configured to determine the total risk value based on partial risk values comprising IP risk values related to existing IPL objects regarding the physical items and/or their respective components.

Embodiment X8: The control system (100) of any one of the embodiments X1 to X7, particularly X1, X4, or X5, wherein the risk evaluator module (110) is further configured to determine the total risk value based on partial risk values comprising IP risk values related to existing IPR objects regarding the physical items and/or their respective components.

Embodiment X9: The control system (100) of any one of the embodiments X1 to X8, particularly X1, X4, or X5, wherein the risk evaluator module (110) is further configured to determine the total risk value based on partial risk values comprising IP risk values related to existing patents regarding the physical items and/or their respective components.

Embodiment X10: The control system (100) of any one of the embodiments X1 to X9, particularly X1, X4, X5, or X9, wherein the risk evaluator module (110) is further configured to determine the total risk value based on partial risk values comprising IP risk values related to existing legal objects regarding the physical items and/or their respective components.

Embodiment X11: The control system (100) of any one of the embodiments X1 to X10, particularly X1, X4, X5, or X9, wherein the risk evaluator module (110) is further configured to determine the total risk value based on partial risk values comprising IP risk values related to existing general legal objects regarding the physical items and/or their respective components.

Embodiment X12: The control system (100) of any one of the embodiments X1 to X11, particularly X1, X4, X5, or X9, wherein the risk evaluator module (110) is further configured to determine the total risk value based on partial risk values comprising IP risk values related to existing technical legal objects regarding the physical items and/or their respective components.

Embodiment X13: The control system (100) of any one of the embodiments X1 to X12, particularly X1, X4, X5 or X9, wherein the risk evaluator module (110) is further configured to determine the total risk value based on partial risk values comprising IP risk values related to existing commercial legal objects regarding the physical items and/or their respective components.

Embodiment X14: The control system (100) of any one of the embodiments X1 to X13, particularly X1, X4, X5, or X9, wherein the risk evaluator module (110) is further configured to determine the total risk value based on partial risk values comprising IP risk values related to existing transaction legal objects regarding the physical items and/or their respective components.

Embodiment X15: The control system (100) of any one of the embodiments X1 to X14, particularly X1, X4, X5, or X9, wherein the risk evaluator module (110) is further configured to determine the total risk value based on partial risk values comprising IP risk values related to existing regulatory legal objects regarding the physical items and/or their respective components.

Embodiment X16: The control system (100) of any one of the embodiments X6 to X15, particularly X9, wherein the first interface (191) is further configured to retrieve information for computing IP risk values from one or more IP databases (320), and/or to retrieve information for computing non-IP risk values from one or more non-IP databases (330).

Embodiment X17: The control system (100) of any one of the embodiments X6 to X15, particularly X9, wherein the first interface (191) is further configured to retrieve information for computing IP risk values from one or more IP databases (320), and/or to retrieve information for computing non-IP risk values from one or more non-IP databases (330) and wherein the risk evaluator module (110) is further configured to detect a change of the total risk value of a particular item based on a partial IP risk value change as a result of a status change of a corresponding IPL object in the one or more IP databases (320).

Embodiment X18: The control system (100) of any one of the embodiments X16 to X17, further comprising: an automatic search tool (130) configured to perform an automatic search for alternative items regarding the particular item (I1) if a detected change of the total risk value associated with the particular item (I1) exceeds a predefined threshold, the search result including the alternative item (I2).

Embodiment X19: The control system (100) of embodiment X18, wherein the automatic search tool (130) further comprises: a first sub-module (131) which is configured to perform automatic searches for alternative items by analyzing IP risk values and identifying one or more alternative items having lower IP risk values than the particular item (I1); and a second sub-module (132) to perform automatic searches for alternative items by analyzing non-IP risk values and identifying one or more alternative items having lower non-IP risk values than the particular item (I1).

Embodiment X20: The control system (100) of any one of the embodiments X1 to X19, particularly X19, wherein the physical composition of the alternative item (I2) corresponds to the physical composition of the particular item (I1) and the CU (120) provides operating instructions to a printer module (PMn) of the production equipment to adjust the print information in accordance with the result of the IP risk value analysis of alternative items.

Embodiment X21: The control system (100) of any one of the embodiments X1 to X20, particularly X9, wherein a change of a particular total risk value for a particular item is associated with risk contributions of one or more particular components, the control unit (120) further configured: to identify for the particular item one or more alternative components as substitutes with lower risk value contributions by searching for components with at least one similar or very similar structure, function and/or technical feature in a corresponding database, and to replace at least one of the one or more particular components with an identified alternative component so that the total risk value of the particular item becomes the lowest total risk value.

Embodiment X22: The control system (100) of any one of the embodiments X1 to X21, wherein the control unit (120) is further configured: in a first control mode, to terminate the execution of the operating instructions for processing the particular item at the end of the first operating time interval, and in a second control mode, terminate the execution of the operating instructions for processing the particular item during the first operating time interval.

Embodiment X23: The control system (100) of any one of the embodiments X1 to X22, wherein the production equipment (200) is configured for performing a chemical process or for performing test production.

Embodiment X24: The control system (100) of any one of the embodiments X1 to X23, wherein the risk evaluator (110) is further configured to detect the change in the determined total risk values if a particular change of at least one of the determined risk values exceeds a predefined tolerance range.

Embodiment X25: A process control method (1000) performed by a control system to control production equipment, the method comprising: obtaining (1100), from a data provisioning module, process control data for operating the production equipment wherein the process control data relates to operating instructions configured to control the production equipment to automatically process one or more physical items and their respective components; determining (1200) for each item a total risk value based on partial risk values associated with the respective components; initiating (1300) execution of the operating instructions for processing a particular item having the lowest total risk value of the determined total risk values during a first operating time interval; detecting (1400) a change in the determined total risk values: if the change in the determined total risk values results in an alternative item having the lowest total risk value, or if the change of the total risk value associated with the particular item exceeds a predefined threshold value, initiating (1500) termination of the execution of the operating instructions for processing the particular item; and if the change in the determined total risk values results in the alternative item having the lowest total risk value, initiating (1600) execution of the operating instructions for processing the alternative item during a second operating time interval.

Embodiment X26: The method of embodiment X25, wherein the alternative item is physically identical to the particular item and the process applied to the alternative item is different from the process applied to the particular item.

Embodiment X27: The method of embodiment X25, wherein the alternative item is physically different from the particular item.

Embodiment X28: The method of embodiment X25, wherein the change in the determined total risk values results in an alternative item (I2) having the lowest total risk value and results in an difference between said total risk value of the alternative item (I2) and the updated total risk value of the particular item (I1) exceeding a predefined threshold difference value.

Embodiment X29: The method any one of the embodiments X25 to X28, further comprising: selecting the alternative item from the plurality of physical items in accordance with a product specification of the particular item in that the alternative item performs a similar function or a very similar function or the same function as the particular item.

Embodiment X30: The method of any one of the embodiments X25 to X29, wherein the partial risk values comprise IP risk values related to existing IPL objects regarding the physical items and their respective components and/or non-IP risk values regarding the physical items and their respective components unrelated to the existing IPL objects.

Embodiment X31: The method of any one of the embodiments X25 to X29, wherein the partial risk values comprise IP risk values related to existing IPL objects regarding the physical items and their respective components.

Embodiment X32: The method of any one of the embodiments X25 to X29, wherein the partial risk values comprise IP risk values related to existing IPR objects regarding the physical items and their respective components.

Embodiment X33: The method of any one of the embodiments X25 to X29, wherein the partial risk values comprise IP risk values related to existing, patents regarding the physical items and their respective components.

Embodiment X34: The method of any one of the embodiments X25 to X29, wherein the partial risk values comprise IP risk values related to existing legal objects regarding the physical items and their respective components.

Embodiment X35: The method of any one of the embodiments X25 to X29, wherein the partial risk values comprise IP risk values related to existing general legal objects regarding the physical items and their respective components.

Embodiment X36: The method of any one of the embodiments X25 to X29, wherein the partial risk values comprise IP risk values related to existing technical legal objects regarding the physical items and their respective components.

Embodiment X37: The method of any one of the embodiments X25 to X29, wherein the partial risk values comprise IP risk values related to existing commercial legal objects regarding the physical items and their respective components.

Embodiment X38: The method of any one of the embodiments X25 to X29, wherein the partial risk values comprise IP risk values related to existing transaction legal objects regarding the physical items and their respective components.

Embodiment X39: The method of any one of the embodiments X25 to X29, wherein the partial risk values comprise IP risk values related to existing regulatory legal objects regarding the physical items and their respective components.

Embodiment X40: The method of any one of the embodiments X25 to X39, wherein detecting (1400) comprises detecting that the total risk value of the particular item has increased so that the total risk value of the alternative item becomes the lowest total risk value of the determined total risk values.

Embodiment X41: The method of any one of the embodiments X25 to X39, wherein detecting (1400) comprises detecting that the total risk value of the alternative item has decreased so that the total risk value of the alternative item becomes the lowest total risk value of the determined total risk values.

Embodiment X42: The method of any one of the embodiments X30 to X39, particularly X33, wherein a particular total risk value change is caused by a partial IP risk value change as a result of a status change of a corresponding IPL object in an IP database.

Embodiment X43: The method of any one of the embodiments X25 to X42, particularly X33, wherein the change of a particular risk value for an item is associated with risk contributions of one or more particular components, the method further comprising: identifying one or more alternative components as substitutes with lower risk value contributions by searching for components with at least one similar or very similar structure, function or technical feature in a corresponding database and determining the respective risk contributions.

Embodiment X44: The method of any one of embodiments X25 to X43, wherein terminating (1500) the execution of the operating instructions for processing the particular item occurs at the end of first operating time interval.

Embodiment X45: The method of any one of embodiments X25 to X43, wherein terminating (1500) the execution of the operating instructions for processing the particular item occurs during the first operating time interval.

Embodiment X46: A computer program product for controlling a process performed by production equipment (200), comprising instructions that when loaded into a memory of a control system and being executed by at least one processor of the control system cause the control system to perform the method steps according to any one of the embodiments X25 to X45.

Figure 7:
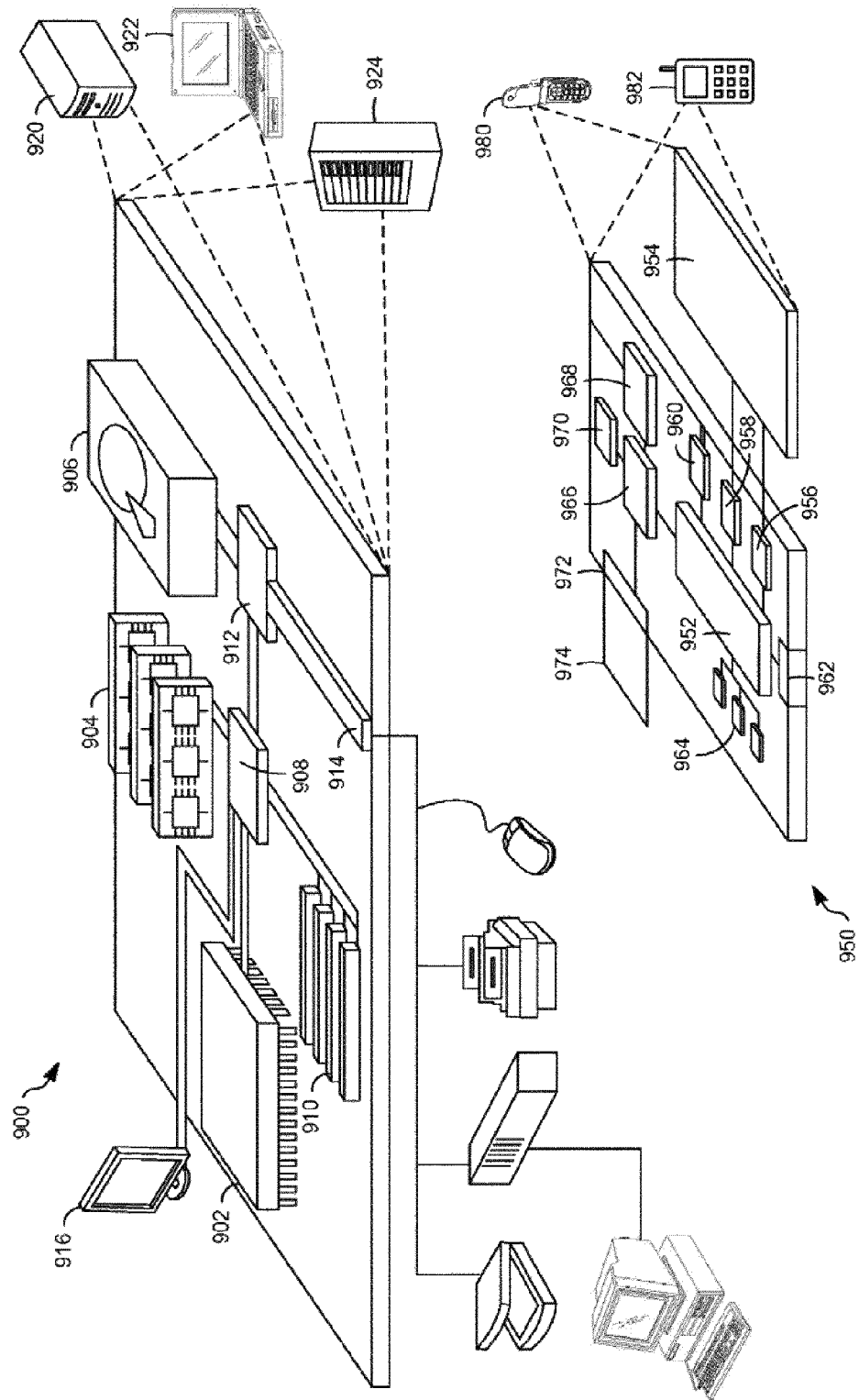
FIG. 7 is a diagram that shows an example of a generic computer device and a generic mobile computer device, which may be used in embodiments of the invention.

FIG. 7 is a diagram that shows an example of a generic computer device 900 and a generic mobile computer device 950, which may be used with the techniques described here, Computing device 900 relate to the control system 100 (cf. FIG. 1). Computing device 950 is intended to represent various forms of mobile devices, such as personal digital assistants, cellular telephones, smart phones, and other similar computing devices. In the context of this disclosure the computing device 950 may serve as a frontend control device of the control system 900. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed controller 912 connecting to low speed expansion port 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information caner is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950 or may also store applications or other information for device 950. Specifically, expansion memory 974 may include instructions to carry out or supplement the processes described above, and may include secure information also. Thus, for example, expansion memory 974 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 96$ or external interface 962.

Device 950 may communicate wirelessly through communication interface 966, which may include digital signal processing circuitry where necessary. Communication interface 966 may provide for communications under various modes or protocols, such as GSM voice calls, SMS. EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wifi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating, on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In one set of embodiments (Embodiments E1 to E21), the following control system and process control method have been found according to the invention:

Embodiment E1: A control system (100) for controlling a process performed by production equipment (200), comprising: a first interface (191) configured to obtain, from a data provisioning module (310), process control data (311) for operating the production equipment (200) wherein the process control data (311) relates to operating instructions configured to control the production equipment (200) to automatically process a plurality of physical items (I1, I2) and their respective components (C1 to Cu); a risk evaluator module (110) configured to determine for each item a total risk value based on partial risk values associated with the respective components (C1 to Cu); a control unit (120) configured to: initiate, via a second interface (192), execution of the operating instructions for processing (a) a particular item (I1) having (a) the lowest total risk value of the determined total risk values, or (b) all items (I1, I2) having a total risk value which is lower than a predefined threshold value.

Embodiment E2: The control system (100) of embodiment E1, wherein the control unit (120) is configured to initiate execution of the operating instructions for processing (a) a particular item (I1) having (a) the lowest total risk value of the determined total risk values.

Embodiment E3: The control system (100) of embodiment E1, wherein the control unit (120) is configured to initiate execution of the operating instructions for processing (b) all items (I1, I2) having a total risk value which is lower than a predefined threshold value.

Embodiment E4: The control system (100) of Embodiment E3, wherein the processing of items is: testing or screening of items, or obtaining information on items.

Embodiment E5: The control system (100) of any one of the Embodiments E1 to E4, wherein the risk evaluator module (110) is further configured to determine the total risk value based on partial risk values comprising IP risk values related to existing IPL objects regarding the physical items and/or their respective components, and/or based on non-IP risk values regarding the physical items and/or their respective components.

Embodiment E6: The control system (100) of any one of the Embodiments E1 to E4, wherein the risk evaluator module (110) is further configured to determine the total risk value based on partial risk values comprising IP risk values related to existing IPL objects regarding the physical items and/or their respective components.

Embodiment E7: The control system (100) of any one of the Embodiments E1 to E4, wherein the risk evaluator module (110) is further configured to determine the total risk value based on partial risk values comprising IP risk values related to existing IPR objects regarding the physical items and/or their respective components.

Embodiment E8: The control system (100) of any one of the Embodiments E1 to E4, wherein the risk evaluator module (110) is further configured to determine the total risk value based on partial risk values comprising IP risk values related to existing patents regarding the physical items and/or their respective components.

Embodiment E9: The control system (100) of any one of the Embodiments E1 to E4, wherein the risk evaluator module (110) is further configured to determine the total risk value based on partial risk values comprising IP risk values related to existing legal objects regarding the physical items and/or their respective components.

Embodiment E10: The control system (100) of any one of the Embodiments E5 to E9, particularly E8, wherein the first interface (191) is further configured to retrieve information for computing IP risk values from one or more IP databases (320), and/or to retrieve information for computing non-IP risk values from one or more non-IP databases (330).

Embodiment E11: The control system (100) of any one of the Embodiments E1 to E10, particularly E8, wherein the production equipment (200) is configured for performing a chemical process or for performing test production.

Embodiment E12: A process control method (1000) performed by a control system to control production equipment, the method comprising: obtaining (1100), from a data provisioning module, process control data for operating the production equipment wherein the process control data relates to operating instructions configured to control the production equipment to automatically process a plurality of physical items and their respective components; determining (1200) for each item a total risk value based on partial risk values associated with the respective components; initiating (1300) execution of the operating instructions for processing (a) a particular item having the lowest total risk value of the determined total risk values, or (b) all items having a total risk value which is lower than a predefined threshold value.

Embodiment E13: The process control method (1000) of Embodiment E12, wherein the method comprises initiating (1300) execution of the operating instructions for processing (a) a particular item having the lowest total risk value of the determined total risk values.

Embodiment E14: The process control method (1000) of Embodiment E12, wherein the method comprises initiating (1300) execution of the operating instructions for processing (b) all items having a total risk value which is lower than a predefined threshold value.

Embodiment E15: The process control method (1000) of any one of the Embodiment E12 to E14, wherein the processing of items is: testing or screening of items, or obtaining information on items.

Embodiment E16: The method of any one of the Embodiments E11 to E15, wherein the partial risk values comprise IP risk values related to existing IPL objects regarding the physical items and their respective components, and/or non-IP risk values regarding the physical items and their respective components unrelated to the existing IPL objects.

Embodiment E17: The method of any one of the Embodiments E11 to E16, wherein the partial risk values comprise IP risk values related to existing IPL objects regarding the physical items and their respective components.

Embodiment E18: The method of any one of the Embodiments E11 to E16, wherein the partial risk values comprise IP risk values related to existing IPR objects regarding the physical items and their respective components.

Embodiment E19: The method of any one of the Embodiments E11 to E16, wherein the partial risk values comprise IP risk values related to existing legal objects regarding the physical items and their respective components.

Embodiment E20: The method of any one of the Embodiments E11 to E16, wherein the partial risk values comprise IP risk values related to existing patents regarding the physical items and their respective components.

Embodiment E21: A computer program product for controlling a process performed by production equipment (200), comprising instructions that when loaded into a memory of a control system and being executed by at least one processor of the control system cause the control system to perform the method steps according to any one of the Embodiments E12 to E20.

In another set of embodiments (Embodiments E31 to E40), the following process control method have been found according to the invention:

Embodiment E31: A process control method (1000) performed by a control system (100) to control production equipment (200), the method comprising: obtaining, from a data provisioning module, process control data for operating the production equipment wherein the process control data relates to operating instructions configured to control the production equipment to automatically process a plurality of physical items and their respective components; initiating execution of the operating instructions for processing a first set (S1) of physical items during a first operating time interval; determining for each item of the first set (S1) a total risk value based on partial risk values associated with the respective components; initiating execution of the operating instructions for processing a subset (S2) among the first set of physical items during a second operating time interval, wherein all physical items within the subset (S2) have a total risk value which is lower than a predefined threshold value.

Embodiment E32: The process control method (1000) of Embodiment E31, wherein the partial risk values comprise IP risk values related to existing IPL objects regarding the physical items and their respective components, and; or non-IP risk values regarding the physical items and their respective components unrelated to the existing IPL objects.

Embodiment E33: The process control method (1000) of Embodiment E31, wherein the partial risk values comprise IP risk values related to existing IPL objects regarding the physical items and their respective components.

Embodiment E34: The process control method (1000) of Embodiment E31, wherein the partial risk values comprise IP risk values related to existing IPR objects regarding the physical items and their respective components.

Embodiment E35: The process control method (1000) of Embodiment E31, wherein the partial risk values comprise IP risk values related to existing legal objects regarding the physical items and their respective components.

Embodiment E36: The process control method (1000) of Embodiment E31, wherein the partial risk values comprise IP risk values related to existing patents regarding the physical items and their respective components.

Embodiment E37: The process control method (1000) of any one of the Embodiments E31 to E36, particularly E36, wherein the processing of items during, the first operating time interval is different to the processing of items during the second operating time interval.

Embodiment E38: The process control method (1000) of any one of the Embodiments E31 to E37, particularly E36, wherein the processing of items during the first operating dine interval is: testing or screening of items, or obtaining information on items.

Embodiment E39: The process control method (1000) of any one of the Embodiments E31 to E37, particularly E36, wherein the processing of items during the first operating time interval and during the second operating time interval is: testing or screening of items, or obtaining information on items.

Embodiment E40: A computer program product for controlling a process performed by production equipment (200), comprising instructions that when loaded into a memory of a control system and being executed by at least one processor of the control system cause the control system to perform the method steps according to any one of the Embodiments E31 to E39.

In another set of embodiments (Embodiments E51 to E60), the following process control method have been found according to the invention:

Embodiment E51: A process control method (1000) performed by a control system (100) to control production equipment (200), the method comprising: obtaining, from a data provisioning module, process control data for operating the production equipment wherein the process control data relates to operating instructions configured to control the production equipment to automatically process a plurality of physical items and their respective components; initiating execution of the operating instructions for processing a first set (S1) of physical items during a first operating time interval; determining for each item of the first set (S1) a total non-IP risk value based on information obtained during processing of said item; determining the total IP risk value for (a) each item of the first set (S1) or for (b) those items of the first set (S1) having a total non-IP risk value which is lower than a predefined threshold value for the total non-IP risk value; determining the total risk value for each item for which a total IP risk value has been determined; initiating execution of the operating instructions for processing a subset (S2) among the first set of physical items during a second operating time interval, wherein all physical items within the subset (S2) have a total risk value which is lower than a predefined threshold value for the total IP risk value.

Embodiment E52: The process control method (1000) of Embodiment E51, wherein the partial risk values comprise IP risk values related to existing IPL objects regarding the physical items and their respective components, and/or non-IP risk values regarding the physical items and their respective components unrelated to the existing IPL objects.

Embodiment E53: The process control method (1000) of Embodiment E51, wherein the partial risk values comprise IP risk values related to existing IPL objects regarding the physical items and their respective components.

Embodiment E54: The process control method (1000) of Embodiment E51, wherein the partial risk values comprise IP risk values related to existing IPR objects regarding the physical items and their respective components.

Embodiment E55: The process control method (1000) of Embodiment E51, wherein the partial risk values comprise IP risk values related to existing legal objects regarding the physical items and their respective components.

Embodiment E56: The process control method (1000) of Embodiment E51, wherein the partial risk values comprise IP risk values related to existing patents regarding the physical items and their respective components.

Embodiment E57: The process control method (1000) of any one of the Embodiments E51 to E56, particularly E56, wherein the processing of items during the first operating time interval is different to the processing of items during the second operating time interval.

Embodiment E58: The process control method (1000) of any one of the Embodiments E51 to E57, particularly E56, wherein the processing of items during the first operating time interval is: testing or screening of items, or obtaining information on items.

Embodiment E59: The process control method (1000) of any one of the Embodiments E51 to E57, particularly E56, wherein the processing of items during the first operating time interval and during the second operating time interval is: testing or screening of items, or obtaining information on items.

Embodiment E60: A computer program product for controlling a process performed by production equipment (200), comprising instructions that when loaded into a memory of a control system and being executed by at least one processor of the control system cause the control system to perform the method steps according to any one of the Embodiments E51 to E59.

Example EX1 for a control method comprising a first-phase formulation testing, a risk evaluation (including an IP risk evaluation) and a second-phase formulation testing:

Part 1 of Example EX1 (EX1P1): For the development of a new floor cleaning agent, a first set of 100 different chemical formulations (i.e. formulations with different chemical compositions) with the serial numbers #1 to #100 are automatically tested on pH value by a first high-throughput testing equipment during the first operating time interval. According to the high-throughput testing, the formulations #1 to #40 have a pH value in the range of 0 to 2 and are automatically assigned a total non IP risk value (=RNIP) of 100% (high risk, e.g. very unsafe for the end user) by the control system, the formulations #41 to #80 have a pH value in the range of 2 to 4 and are automatically assigned a RNIP of 50% (medium risk, e.g. a little unsafe for the end user), and the formulations #81 to #100 have a pH value in the range of 4 to 6 and are automatically assigned a RNIP of 0% (low risk, e.g. safe for the end user), wherein the assignment of the risk value is done by the risk evaluator module within the control system. In the example, the predefined threshold value for RNIP is 60% (i.e. not above 60%), thus the formulations #1 to #40 will be automatically sorted out and will not be further processed.

Part 2 of Example EX1 (EX1P2): In the next step, the IP risks of the chemical formulations #41 to #100 which passed the predefined threshold value for RNIP, are automatically determined by the risk evaluator module within the control system, particularly regarding third party patents related to these chemical formulations using IP databases, and according to this determination, the formulations #41 to #50 have a total IP risk value (=RIP) of 0% (low risk, e.g. would not fall under any claims of any patents), the formulations #51 to #70 have a RIP of 50% (medium risk, e.g. would fall under the pending claims of a patent application which has not been granted yet), and the formulations #71 to #100 have a RIP of 90% (high risk, e.g. would fall under the claims of a potentially valid granted utility patent). In the example, the total risk value (=Rt) is computed as: Rt=0.5*RNIP+0.5*RIP, thus the formulations #41 to #50 have a Rt of 25%, the formulations #51 to #70 have a Rt of 50%, the formulations #71 to #80 have a Rt of 70%, the formulations #81 to #100 have a Rt of 45%. In the example, the predefined threshold value for Rt is 49% (i.e. not above 49%), thus the formulations #51 to #80 will be automatically sorted out and will not be further processed.

Part 3 of Example EX1 (EX1P3): In the next step, only the formulations #41 to #50 and #81 to #100 which form a subset among the first set of formulations, will be automatically tested on the capability to remove fat (which is often present on the kitchen floor) by a second high-throughput testing equipment during the second operating time interval.

Example EX2 for a control method comprising a first-phase formulation testing, a risk evaluation (including an legal risk evaluation) and a second-phase formulation testing:

Part 1 of Example EX2 (EX2P1): Identical to Part 1 of Example EX1 (EX1P1).

Part 2 of Example EX2 (EX2P2): In the next step, the IP risks of the chemical formulations #41 to #100, which passed the predefined threshold value for RNIP, are automatically determined by the risk evaluator module within the control system, particularly regarding the legal requirements to apply for a new chemicals registration for the formulation (or a substance contained therein) according to existing chemicals registration laws (e.g. REACH) using chemicals registration databases, and according to this determination the formulations #41 to #50 have a total IP risk value (=RIP) of 0% (low risk, e.g. no new chemicals registration required), the formulations #51 to #70 have a RIP of 50% (medium risk, e.g. new chemicals registration required and likelihood to obtain it is high due to unproblematic toxicity profile), and the formulations #71 to #100 have a RIP of 90% (high risk, e.g. new chemicals registration required and likelihood to obtain it is low due to problematic toxicity profile). In the example, the total risk value (=Rt) is computed as: Rt=0.5*RNIP+0.5*RIP, thus the formulations #41 to #50 have a Rt of 25%, the formulations #51 to #70 have a Rt of 50%, the formulations #71 to #80 have a Rt of 70%, the formulations #81 to #100 have a Rt of 45%. In the example, the predefined threshold value for Rt is 49% (i.e. not above 49%), thus the formulations #51 to #80 will be automatically sorted out and will not be further processed.

Part 3 of Example EX2 (EX2P3): Identical to Part 3 of Example EX1 (EX1P3).

The advantage as shown in these two examples is that more expensive or complex processes (for example the test on the capability to remove fat) only need to be done for a preselected subset of items, thus accelerating the speed of these processes and saving valuable resources.

What is claimed is:

1. A computer-implemented process control method performed by a control system to control production equipment, wherein the production equipment is selected from: physically existent equipment which is suitable for processing at least one component of a physical item, or physically existent equipment which is suitable for processing the physical item, the method comprising:
    receiving process control data, wherein the process control data is representative of operating instructions to control the production equipment to process a plurality of physical items and their respective components;
    controlling the production equipment to process a first set of physical items, during a first operating time interval, based on the process control data;
    determining a total risk value for each physical item of the first set of physical items based on partial risk values associated with respective components;
    determining a first subset of physical items and a second subset of physical items from the first set of physical items, wherein each physical item within the first subset of physical items has a first total risk value lower than a predefined risk threshold value, and wherein each physical item within the second subset of physical items has a second total risk value above the predefined risk threshold value; and
    controlling the production equipment to further process the first subset of physical items to produce a second set of physical items, during a second operating time interval, based on the process control data and the first total risk value.

2. The method of claim 1, wherein the partial risk values comprise IP risk values related to existing IPL objects regarding the physical items and their respective components, and/or non-IP risk values regarding the physical items and their respective components unrelated to the existing IPL objects.

3. The method of claim 1, wherein processing of physical items during the first operating time interval is different to the processing of physical items during the second operating time interval.

4. The method of claim 3, wherein the processing of physical items during the first operating time interval is: testing or screening of physical items, or obtaining information on physical items.

5. The method of claim 1, wherein the processing of physical items during the first operating time interval and during the second operating time interval is: testing or screening of physical items, or obtaining information on items.

6. The method of claim 1, wherein the set of physical items include at least one of: a machine, a mechanical part, an electrical part, a device, an instrument, a vehicle, a building element, a consumer good, a food, a beverage, a molecule, a chemical compound, a chemical substance, a chemical composition, an organism in a living state, an organism in a dead state, a plant in a live state, a plant in a dead state, a micro-organism in a live state, or a micro-organism in a dead state.

7. The method of claim 1, wherein the components include at least one of: a physically existent part of a respective physical item, and wherein two components of the respective physical item are different from each other when the two components differ in at least one technical feature.

8. A non-transitory computer-readable medium, storing computer-readable instructions that, when executed by a processor, cause the processor to control production equipment to produce a physical item, wherein the production equipment is selected from: physically existent equipment which is suitable for processing at least one component of a physical item, or physically existent equipment which is suitable for processing the physical item, the computer-readable medium comprising:
- a process control data receiving module that, when executed by the processor, causes the processor to receive process control data, wherein the process control data is representative of operating instructions to control the production equipment to process a plurality of components;
- a first processing module that, when executed by the processor, causes the processor to control the production equipment to process a first set of physical items, during a first operating time interval, based on the process control data;
- a first total risk value determination module that, when executed by the processor, causes the processor to determine a total risk value for each physical item of the first set of physical items based on partial risk values associated with respective components;
- a physical item subset determination module that, when executed by the processor, causes the processor to determine a first subset of physical items and a second subset of physical items from the first set of physical items, wherein each physical item within the first subset of physical items has a first total risk value lower than a predefined risk threshold value, and wherein each physical item within the second subset of physical items has a second total risk value above the predefined risk threshold value; and
- a second processing module that, when executed by the processor, causes the processor to control the production equipment to process the first subset of physical items to produce a second set of physical items, during a second operating time interval, based on the process control data and the first total risk value.

9. The computer-readable medium of claim 8, wherein the partial risk values comprise IP risk values related to existing IPL objects regarding the physical items and their respective components, and/or non-IP risk values regarding the physical items and their respective components unrelated to the existing IPL objects.

10. The computer-readable medium of claim 8, wherein processing of physical items during the first operating time interval is different to the processing of physical items during the second operating time interval.

11. The computer-readable medium of claim 10, wherein the processing of physical items during the first operating time interval is: testing or screening of physical items, or obtaining information on physical items.

12. The computer-readable medium of claim 8, wherein the processing of physical items during the first operating time interval and during the second operating time interval is: testing or screening of physical items, or obtaining information on physical items.

13. The computer-readable medium of claim 8, wherein a first total risk value of a physical item includes partial risk values which are associated with different risk categories selected from: technical issues or non-technical issues.

14. A process control system having production equipment to produce a physical item, wherein the production equipment is selected from: physically existent equipment which is suitable for processing at least one component of a physical item, or physically existent equipment which is suitable for processing the physical item, the system comprising:
- a process control data receiving module stored on a memory that, when executed by a processor, causes the processor to receive process control data and, wherein the process control data is representative of operating instructions to control the production equipment to process a plurality of components;
- a first processing module stored on the memory that, when executed by the processor, causes the processor to control the production equipment to process a first set of physical items, during a first operating time interval, based on the process control data;
- a total risk value determination module stored on the memory that, when executed by the processor, causes the processor to determine a total risk value for each physical item of the first set of physical items based on partial risk values associated with respective components;
- a physical item subset determination module stored on the memory that, when executed by the processor, causes the processor to determine a first subset of physical items and a second subset of physical items from the first set of physical items, wherein each physical item within the first subset of physical items has a first total risk value lower than a predefined risk threshold value, and wherein each physical item within the second subset of physical items has a second total risk value above the predefined risk threshold value; and
- a second processing module stored on the memory that, when executed by the processor, causes the processor to control the production equipment to process the first subset of physical items to produce a second set of physical items, during a second operating time interval, based on the process control data and the first total risk value.

15. The system of claim 14, wherein the partial risk values comprise IP risk values related to existing IPL objects regarding the physical items and their respective components, and/or non-IP risk values regarding the physical items and their respective components unrelated to the existing IPL objects.

16. The system of claim 14, wherein the physical item is selected from: a machine, a mechanical part, an electrical part, a device, an instrument, a vehicle, a building element, a consumer good, a food, a beverage, a molecule, a chemical compound, a chemical substances, a chemical composition, an organism in a living, an organism in a dead state, a plant in a living state, a plant in a dead state, a micro-organisms in a living state, a micro-organism in a dead state.

17. The system of claim 14, wherein a component is a physically existent part of the physical item.

18. The system of claim 14, wherein the first partial risk values are representative of a technical feature selected from: a feature determined by a human sense organ, a feature determined by a sense organ of another living organism, a feature determined by a physically existent instrument, a physical feature, a chemical feature, a biological feature, a weight, a geometry, a density, a temperature, a color, a viscosity, a conductivity, a durability, a chemical composition in an analytical sense, a molecule contained in a component, a chemical substance contained in a component, a solubility, a reactivity, a reaction rate, a chemical structure, a sterility, a reproduction rate, a fertility, a gene sequences, a physical item that comprises computer data, a component that comprises computer data, a physical item that has undergone a certain physical process, a physical item that has undergone a certain chemical process, a component that has undergone a certain physical, or a component that has undergone a certain chemical process.

19. The system of claim 14, wherein the production equipment is selected from: physically existent equipment which is suitable for processing at least one component of a physical item, or physically existent equipment which is suitable for processing the physical item.

20. The system of claim 14, wherein the partial risk values are selected from: a non-IPL-object-related risk factor, a technical risk, a commercial, a financial risks, an EHS risk, a toxicity, a pathogenicity, electromagnetic radiation, particle radiation, acoustic radiation, an IT related risk, data loss, or data misappropriation.

21. The system of claim 14, wherein processing of physical items during the first operating time interval is different to the processing of physical items during the second operating time interval.

* * * * *